United States Patent

[11] 3,550,848

| [72] | Inventors | William K. Body<br>Whittier;<br>Russell J. Locascio; Harold W. Rice,<br>Fullerton; Douglas R. Scott, Santa Ana,<br>Calif. |
|---|---|---|
| [21] | Appl. No. | 714,140 |
| [22] | Filed | Dec. 18, 1967<br>Division of Ser. No. 432,228, Feb. 12,<br>1965, Patent No. 3,384,071. |
| [45] | Patented | Dec. 29, 1970 |
| [73] | Assignee | Robertshaw Controls Company<br>Richmond, Va.<br>a corporation of Delaware |

[54] COOKING APPARATUS AND METHODS
4 Claims, 28 Drawing Figs.

[52] U.S. Cl............................................. 236/15,
236/46, 236/79, 137/84, 137/624.18
[51] Int. Cl........................................................ F23 5/22,
G05d 23/32
[50] Field of Search............................................. 236/15A,
46, 82, 86, 79

[56] References Cited
UNITED STATES PATENTS

| 2,435,493 | 2/1948 | Cary............................ | 62/208 |
| 1,977,216 | 10/1934 | Unger.......................... | 236/15 |
| 2,376,573 | 5/1945 | Cockley...................... | 236/46 |
| 2,543,120 | 2/1951 | McLeod, Jr. et al......... | 236/82 |
| 3,136,483 | 6/1964 | Swanson..................... | 236/86X |
| 3,123,298 | 3/1964 | Wolffe........................ | 236/46 |

Primary Examiner—William E. Wayner
Attorneys—Auzville Jackson, Jr., Robert L. Marben, Candor, and Candor & Tassone

ABSTRACT: This disclosure relates to pneumatic control means utilized to control the operation of a cooking apparatus, whether the cooking apparatus has an oven, or a range type burner, or both, such pneumatic control means comprising pneumatic actuators for controlling the flow of fuel to the burner means as well as for latching the oven door means in its closed position for oven cleaning operations, adjusting the burner means to various positions thereof and automatically controlling a cooking operation thereof, such features being utilized singly or in any combination thereof.

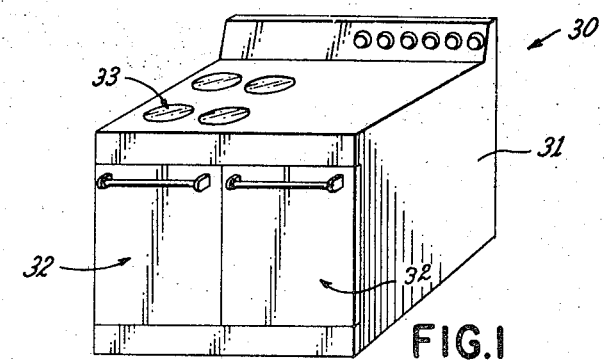
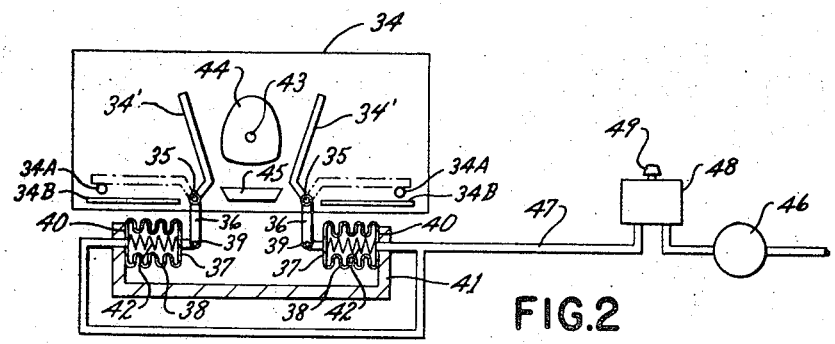
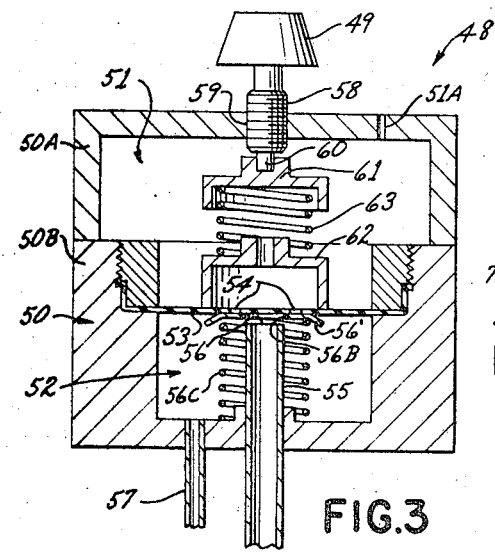
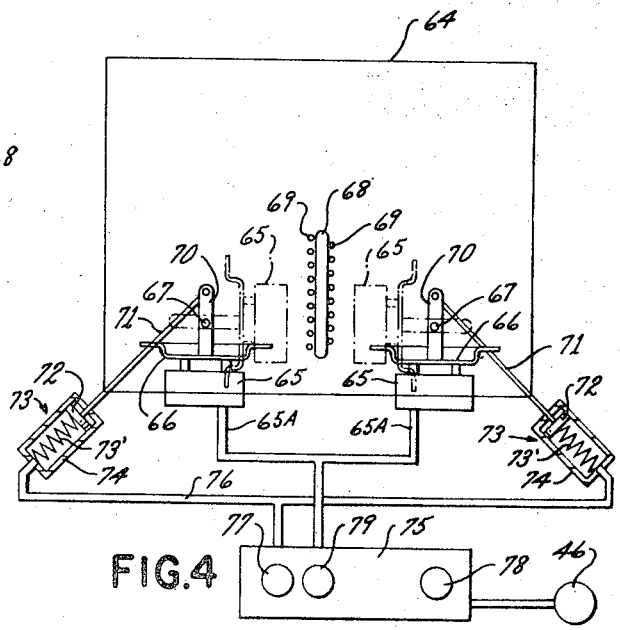
INVENTORS
WILLIAM K. BODY
RUSSELL J. LOCASCIO
HAROLD W. RICE
DOUGLAS R. SCOTT
THEIR ATTORNEYS

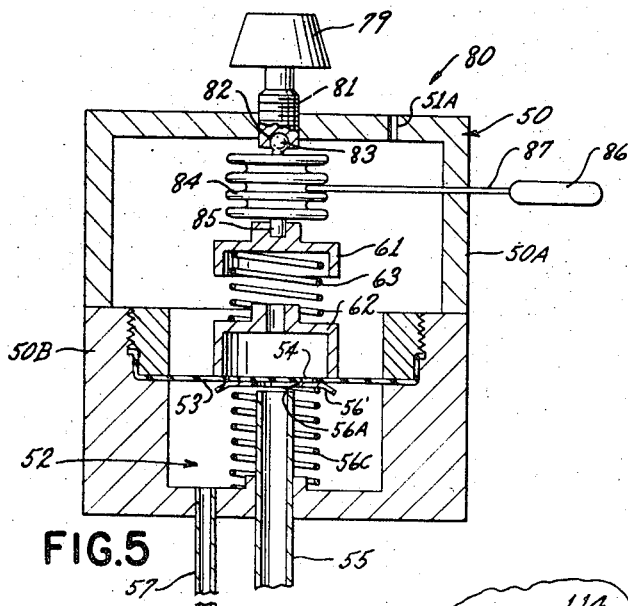

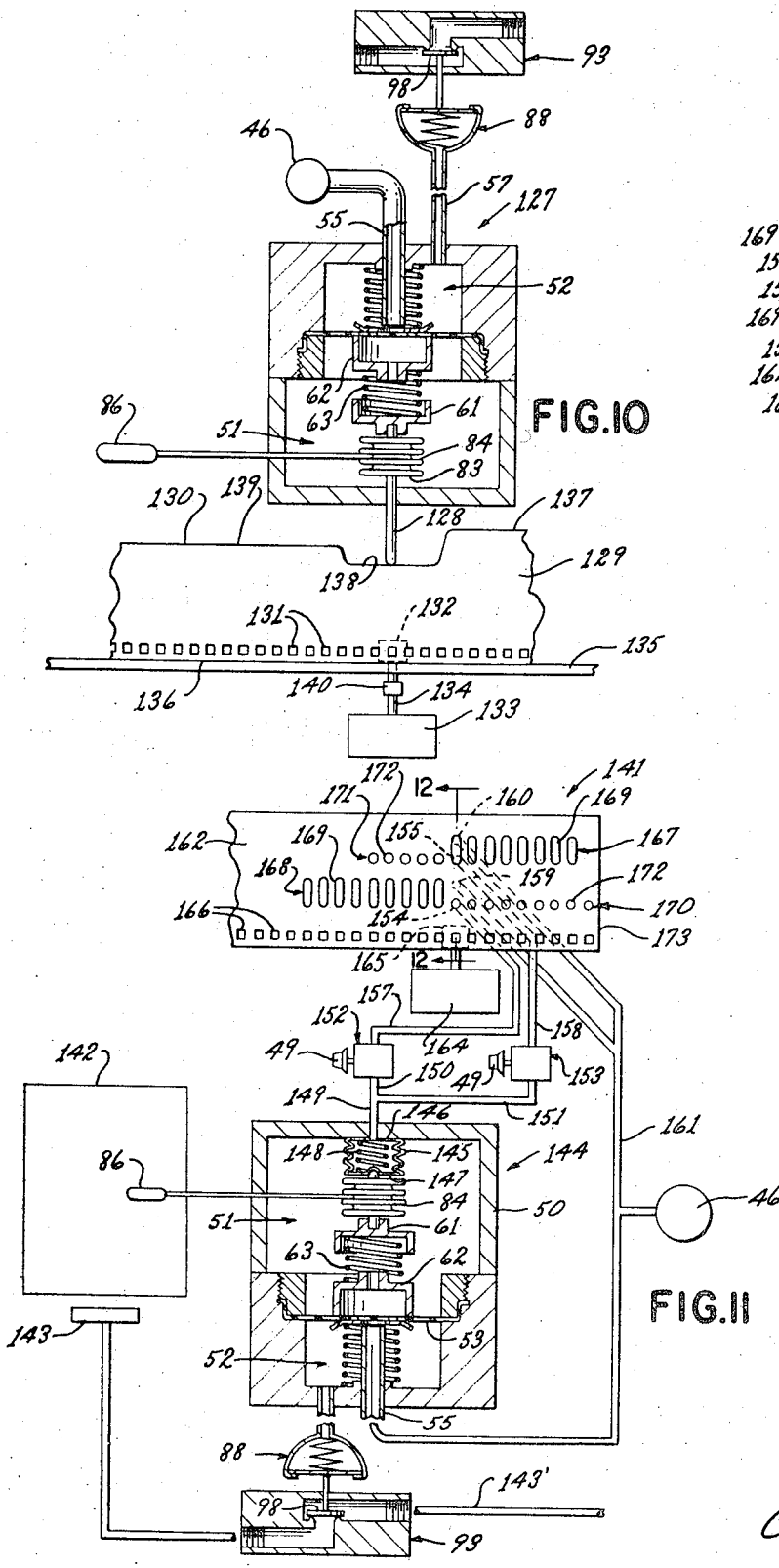
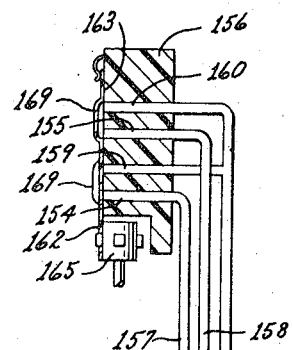

INVENTORS
WILLIAM K. BODY
RUSSELL J. LOCASCIO
HAROLD W. RICE
DOUGLAS R. SCOTT

THEIR ATTORNEYS

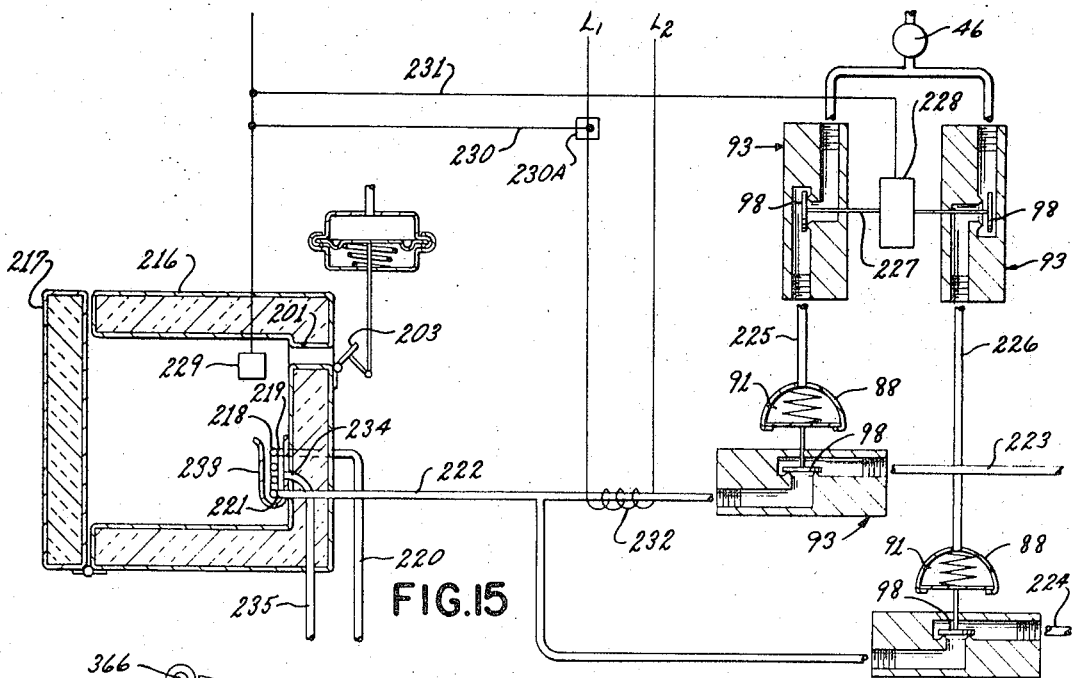
FIG.15
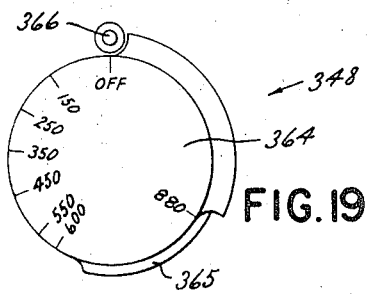
FIG.19
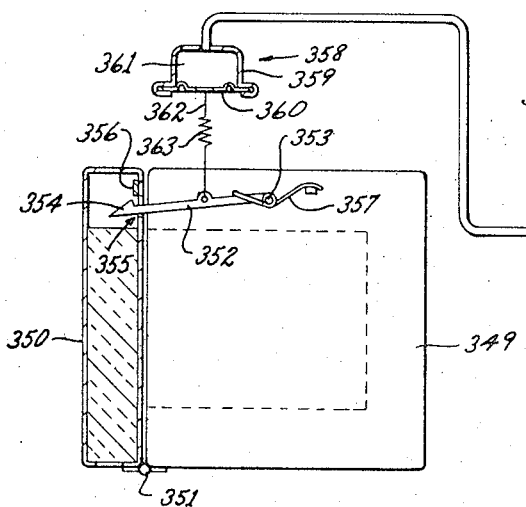
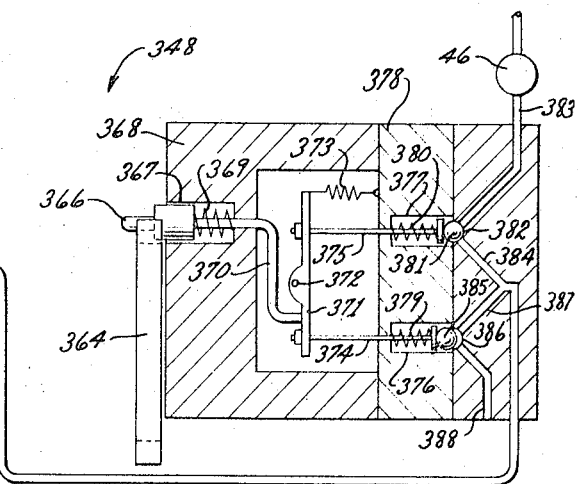
FIG.18
INVENTORS
WILLIAM K. BODY
RUSSELL J. LOCASCIO
HAROLD W. RICE
DOUGLAS R. SCOTT
Caudor & Caudor
THEIR ATTORNEYS

INVENTORS
WILLIAM K. BODY
RUSSELL J. LOCASCIO
HAROLD W. RICE
DOUGLAS R. SCOTT

THEIR ATTORNEYS

COOKING APPARATUS AND METHODS

This application is a divisional patent application of its copending parent application, Ser. No. 432,228, filed Feb. 12, 1965, and is assigned to the same assignee to whom the parent application is assigned.

This invention relates to a cooking apparatus or the like having improved means for controlling the operation of the burner means and other parts thereof in a manner hereinafter described.

In particular, this invention provides means wherein the various operating parts of a cooking apparatus or the like are adapted to be pneumatically controlled in a unique and novel manner to provide an improved cooking apparatus.

Accordingly, it is an object of this invention to provide an improved cooking apparatus or the like having one or more of the novel features of this invention as set forth above or hereinafter shown or described.

A further object of this invention is to provide improved methods of controlling such cooking apparatus or the like.

Another object of this invention is to provide improved parts for such a cooking apparatus or the like.

Other objects, uses and advantages of this invention are apparent from a reading of this description which proceeds with reference to the accompanying drawings forming a part thereof and wherein:

FIG. 1 is a perspective view illustrating one type of cooking apparatus to which the various features of this invention are applicable;

FIG. 2 is a schematic front view illustrating one embodiment of the oven of the cooking apparatus of FIG. 1;

FIG. 3 is an enlarged, fragmentary, cross-sectional view illustrating one embodiment of the vacuum regulator of FIG. 2;

FIG. 4 is a view similar to FIG. 2 and illustrates another embodiment for the cooking apparatus of FIG. 1;

FIG. 5 is a schematic cross-sectional view illustrating one embodiment of this invention for controlling the temperature in the oven of the cooking apparatus of FIG. 1;

FIG. 6 is a schematic side view illustrating another embodiment of this invention for varying the position of the oven casing of the embodiment of the cooking apparatus of FIG. 1;

FIG. 7 is a schematic, fragmentary side view illustrating an embodiment of this invention for varying the position of the burner means in the cooking apparatus of FIG. 1;

FIG. 8 is a fragmentary rear view of the structure illustrated in FIG. 7;

FIG. 9 is a view similar to FIG. 7 and illustrates another embodiment of this invention;

FIG. 10 is a schematic view illustrating one method for controlling the operation of the oven of the cooking apparatus of FIG. 1;

FIG. 11 is a schematic view illustrating another embodiment of this invention for controlling the temperature of the oven of the cooking apparatus of FIG. 1;

FIG. 12 is a cross-sectional view taken on line 12–12 of FIG. 11;

FIG. 15 is a view similar to FIG. 14 and illustrates a humidity control for the oven of the cooking apparatus of FIG. 1;

FIG. 17 is a view similar to FIG. 16 and illustrates another embodiment of this invention;

FIG. 18 is a view similar to FIG. 17 and illustrates another embodiment of this invention;

Figure 13:
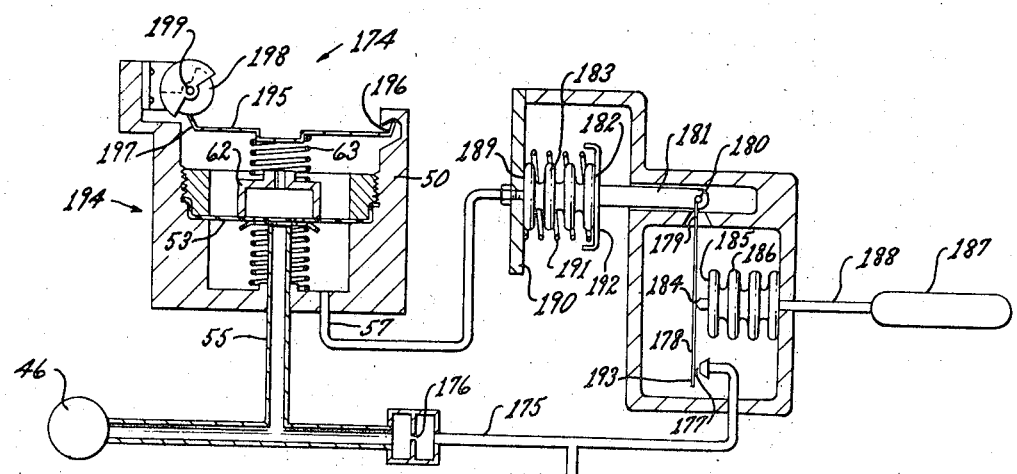
FIG. 13 is a view similar to FIG. 11 and illustrates another embodiment of this invention.

While the various features of this invention are hereinafter described and illustrated as being particularly adaptable for a cooking apparatus of one general type, it is to be understood that the various features of this invention can be utilized singly or in any combination thereof with other cooking apparatus or other devices as desired.

Further, while this invention is hereinafter described in connection with vacuum operated devices, it is to be understood that this invention can be utilized with pressure operated devices or the like.

Therefore, this invention is not to be limited to only the embodiments illustrated in the drawings, because the drawings are merely utilized to illustrate some of the wide variety of uses of this invention.

Referring now to FIG. 1, an improved cooking apparatus of this invention is generally indicated by the reference numeral 30 and comprises a frame or casing structure 31 housing one or more cooking ovens 32 and one or more top burner units 33 each constructed in a manner hereinafter described.

For example, reference is made to FIG. 2 wherein one of the ovens 32 is defined by a casing 34 having a plurality of radiant type gas burners 34' pivotally mounted to the casing 34 or structure 31 by pivot pins 35, each burner means 34' having a lever arm 36 extending beyond its pivot point 35 and being pivotally secured to a movable wall 37 of a flexible bellows 38 by a pivot pin 39 for a purpose hereinafter described.

If desired, stops or rests 34A can be utilized to support the burners 34' in their horizontal positions and drip deflector 34B can be utilized therewith.

Each bellows 38 has a wall 40 fixed to stationary frame means 41. Each bellows 38 has a compression spring 42 disposed therein and continually tending to urge its respective burner means 34' about its pivot pin 35 to assume the position illustrated in dotted lines in FIG. 2 whereby the burner means 34' in their dotted line positions will provide normal baking means for the oven casing 34.

However, when it is desired to utilize a rotisserie 43 in the oven casing 34, means are provided to impose vacuum conditions in the bellows 38 to cause the burner means 34' to pivot toward each other in the manner illustrated by full lines in FIG. 2 to provide means for cooking meat 44 and the like rotated therebetween by the rotisserie 43 in a conventional manner, a suitable drip pan 45 being provided for such rotisserie cooking.

In particular, a vacuum pump 46 is provided and is interconnected to the interior of the bellows 38 by conduit means 47, the conduit means having a vacuum regulator 48 disposed therein whereby the degree of vacuum imposed on the bellows constructions 38 can be controlled by properly positioning the control knob 49 of the regulator 48.

In this manner, the amount of total movement of the burner means 34' from their dotted line positions toward the rotisserie 43 can be controlled by the regulator 48 so that the spacing between the burner means 34' can be readily controlled.

Since the vacuum regulator 48 will impose a constant selected vacuum condition on the bellows constructions 38 to tend to move the walls 37 thereof toward the fixed walls 40 in opposition to the force of the compression springs 42, the burner means 34' will be held in the desired pivoted positions thereof by the regulated vacuum in the bellows constructions 38.

While the vacuum regulator 48 can be of any suitable structure, one embodiment thereof is illustrated in FIG. 3 and will now be described.

As illustrated in FIG. 3, the regulator 48 includes a housing means 50 having two parts 50A and 50B and having two chambers 51 and 52 formed therein and divided by a flexible diaphragm 53 having a plurality of bleed orifices 54 formed therein and interconnecting the chamber 51 with the chamber 52, the chamber 51 being suitably interconnected to the atmosphere by opening 51A while the chamber 52 is sealed therefrom.

A conduit 55 extends into the chamber 52 and has an upper end 56 normally spaced from the diaphragm 53 because of the resultant influence of springs 63 and 56C, the conduit 55 being interconnected to the vacuum source 46. A vent hole closing member 56' is normally urged by spring 56C against the diaphragm 53 to close the vent orifices 54 from the chamber 52, the member 56' having an opening 56A therein bigger than the outside diameter of the end 56 of the conduit 55.

The chamber 52 is also interconnected to the desired vacuum operated device by a conduit 57. Therefore, as long as the diaphragm 53 remains in the position illustrated in FIG. 3, the greatest degree of vacuum is imposed in the conduit 57 because the vacuum source 46 is fully interconnected to the conduit 57 and the member 56' closes the vent ports 54.

Therefore, in order to regulate the degree of vacuum in the chamber 52 and, thus, in the conduit 57, means are provided for tending to resist the natural movement of the diaphragm 53.

In particular, a threaded adjusting member 58 is mounted in a threaded bore 59 of the housing means 50 and carries the control knob 49 on one end thereof. The other end 60 of the adjusting screw 58 engages a collar means 61 in a manner to provide relative movement therebetween.

Another collar means or retainer 62 is disposed below the retainer 61 and is separated therefrom by a compression spring 63 whereby the compression spring 63 tends to urge the retainer 62 into engagement with the diaphragm 53 and tends to move the same downwardly in FIG. 3, the force of the compression spring 63 being varied by the position of the threaded fastening member 58 relative to the housing means 50.

Therefore, it can be seen that the force of the compression spring 63 adds to the force of the air pressure in the chamber 51 to tend to move the diaphragm 53 downwardly in FIG. 3 to cover the end 56 of the vacuum source conduit 55 whereby further movement of the diaphragm 53 downwardly causes the same to flex on the end 56 of the conduit 55 so that the closing member 56' will be moved away from the openings 54. In this manner the degree of vacuum in the chamber 52 will be correspondingly reduced, the greater the force of the compression spring 63 urging the retainer 62 downwardly, the lower the degree of vacuum being imposed in the chamber 52.

Thus, should the degree of vacuum in the chamber 52 exceed that set by the knob 49, the combined force of the compression spring 63 and the air pressure acting downwardly on the diaphragm 53 will cause the diaphragm 53 to close the end 56 of the conduit 55 until sufficient air has bled into the chamber 52 through the apertures 54 to return the diaphragm 53 to a position to just cover the end 56 of the vacuum conduit 55 and have the sealing member 56' close the openings 54 whereby a stabilized condition will exist in the chamber 52.

Accordingly, it can readily be seen that by utilizing the regulator 48 of FIG. 3 in the system illustrated in FIG. 2, the spacing between the burner means 34' can be effectively regulated by the regulator 48 in the manner previously described.

For further description of the operation and details of the regulator 48, see the U.S. Pat. No. 3,142,966, entitled "Vacuum Servo System and the Like".

Another embodiment for controlling the burner means of one of the ovens 32 of the cooking apparatus 30 of FIG. 1 is illustrated in FIG. 4 and comprises an oven casing 64 having a pair of movable burner means 65 respectively having flame spreaders 66 attached thereto, each burner means 65 being movable about a pivot pin 67 fixed to the casing 64 or the casing 31 as desired and being interconnected to a gas source by flexible gas connectors 65A.

Each burner means 65 is adapted to be disposed in the full line position illustrated in FIG. 4 to provide a dual burner conventional baking means for the oven 64.

However, the burner means 65 are adapted to be pivoted to the dotted line positions illustrated in FIG. 4 by pneumatic means in a manner hereinafter described to provide means to broil food 68 disposed between a pair of vertically disposed grills 69, the grills 69 being adapted to be normally disposed below the burners 65 and be moved to the vertical position illustrated in FIG. 4 by pneumatic means as desired.

In particular, each burner means 65 has a lever 70 extending beyond the pivot point 67 thereof and interconnected to a piston rod 71 interconnected to a piston 72 of a piston and cylinder arrangement 73, the piston 72 normally being urged to the full line position by a compression spring 73' disposed in the cylinder defining member 74.

However, when a vacuum is imposed in the cylinder 74, the piston 72 is drawn downwardly in FIG. 4 to cause the respective burner means 65 to pivot 90° to its dotted line position in opposition to the force of the compression spring 73' so that the particular burner means 65 can be utilized for broiling purposes.

For example, a suitable control device 75 can be provided to interconnect the source of vacuum 48 to a conduit means 76 leading to the cylinders 74 when a control knob 77 is disposed in a broil position thereof to cause the burner means 65 to move to their dotted line positions and remain therein as long as the control knob 77 is in its broil position. However, when the control knob 77 is moved to its bake position, the vacuum source 46 is disconnected from the cylinders 74 so that the cylinders 74 can return to normal atmospheric conditions whereby the force of the compression springs 73' return the burner means 65 to their full line positions for baking purposes.

In addition, the control device 75 can include a control knob 78 which will control the position of the grills or grids 69.

In addition, the control device 75 can include a temperature control knob 79 for controlling the temperature in the oven casing 64 in a manner now to be described.

As illustrated in FIG. 5, the control knob 79 forms part of a vacuum regulator 80 formed in a manner similar to the regulator 48 previously described whereby like parts of the regulators 80 and 48 will be indicated by like reference numerals.

As illustrated in FIG. 5, the control knob 79 is interconnected to one end of an adjusting screw 81 having a socket 82 at the other end thereof and receiving a ball end 83 of an expansible and contractible element 84 whereby the ball end 83 of the element 84 is fixed relative to the housing means 50 in any one adjusted position of the adjusting member 81.

The other end 85 of the element 84 is operatively interconnected to the retainer 61. The interior of the expansible element 84 is interconnected to a temperature sensing bulb 86 by a conduit means 87 whereby the expansible element 84 will expand upon an increase of temperature sensed by the bulb 86 and will collapse upon a decrease of temperature sensed by the bulb 86, the bulb 86 being suitably mounted in the oven or the like.

Therefore, it can be seen that in the regulator 80, the vacuum condition created in the vacuum chamber 52 will be in relation to the temperature sensed by the temperature sensing bulb 86, the temperature range of the bulb 86 being controlled by the knob 79.

The outlet conduit 57 of the regulator 80 is interconnected to a pneumatic actuator 88 being defined by a housing member 89 having a flexible diaphragm 90 cooperating therewith to define a chamber 91, the diaphragm 90 normally being urged downwardly in FIG. 5 by a compression spring 92 disposed in the chamber 91.

A valve means 93 is disposed in the fuel supply system to one of the burner means 65 and comprises a housing 94 having an inlet 95 and an outlet 96 interconnected together by a valve seat 97, the valve seat 97 being opened and closed by a valve member 98 interconnected to the diaphragm 90 by suitable means 99.

Thus, when the regulator 80 is not imposing any vacuum in the chamber 52 thereof, the chamber 91 of the actuator 88 for each burner means 65 is at atmospheric condition whereby the compression spring 92 holds the respective valve member 98 against the seat 97 to prevent the flow of fuel to the burner means 65.

However, when the regulator 80 interconnects the vacuum source to the chamber 52, the chambers 91 of the actuators 88 are evacuated to the degree set by the control knob 79 whereby fuel is adapted to flow to the burners 65.

However, when the temperature in the oven casing 64 reaches the temperature selected by the knob 79, the expansible element 84 has expanded to such a degree that the same causes the retainer 61 to move downwardly, thereby compressing spring 63, which tends to push item 62 down against the diaphragm 53, pushing vent closing member 56′ down and the resulting deflection of the diaphragm 53 opens a passage through apertures 54 permitting air to enter chamber 52 thereby reducing the vacuum in actuator 88. The degree of opening of valve 93 is thereby reduced to reduce the heat output of the burners to maintain the temperature in compartment 64 at the setting of dial 79. In this manner, the supply of fuel to the burner means 65 is temporarily terminated or reduced until the sensing bulb 86 senses a temperature in the oven casing 64 below the selected temperature whereby the element 84 has collapsed to such a degree that the diaphragm 53 permits the chamber 52 to return to a vacuum condition which will open the valve members 98 in opposition to the force of the compression springs 92.

Thus, it can be seen that the regulator 80 is adapted to regulate the temperature in the oven casing 64 by varying the degree of vacuum imposed on the actuators 88 in the manner previously described.

While the valve means 93 have been illustrated with a direct connection between the valve members 98 and the diaphragms 90, it is to be understood that a snap action structure could be utilized therein to open the valve members 98 with a snap action when a desired vacuum condition exists in the chamber 91 whereby further opening of the valve members 98 is controlled in a throttling manner by the regulator 80.

Referring now to FIG. 6, another oven casing 100 of this invention is provided for one of the oven sections 32 of the cooking apparatus 30 of FIG. 1, the oven casing 100 being vertically movable by pneumatic means in a manner hereinafter described relative to a stationary burner means 101.

In particular, when the oven casing 100 is disposed in the position illustrated in full lines in FIG. 6, the oven casing 100 can be utilized for baking purposes as the burner means 101 is in a lower position therein. However, when the oven casing 100 is moved to the dotted line position illustrated in FIG. 6, it can be seen that the oven casing 100 can be utilized for broiling purposes as the burner means 101 will be disposed at the top thereof.

The oven casing 100 can be counterbalanced by a suitable negator spring means 102 so that movement between its upper and lower positions can be readily effected by pneumatic means now to be described.

In particular, a plurality of telescoping tubular members 103 are provided with the end 104 thereof being interconnected to a bracket 105 interconnected to the oven casing 100. The tubular members 103 are disposed in their untelescoped positions by suitable compression springs disposed therein whereby the oven casing 100 is normally disposed in the full line position illustrated in FIG. 6. However, when it is desired to utilize the casing 100 for broiling purposes, the vacuum source 46 is interconnected to a conduit means 106 leading to the interior of the telescoping members 103 through a control device 107 whereby the tubular members 103 will be drawn into their telescoping positions illustrated in dotted lines in FIG. 6 to move the oven casing 100 from its full line position to its dotted line position, the control device 107 having a suitable control knob 108 for interconnecting the vacuum source 46 to the conduit 106.

Instead of moving the oven casing relative to the burner means to provide for baking and broiling purposes, it is to be understood that the burner means could be moved relative to the oven casing for such purpose.

In particular, reference is made to FIGS. 7 and 8 wherein another oven casing of this invention is indicated by the reference numeral 109 and has a vertical slot 109A passing therethrough through which a suitable burner means 110 can project and be disposed in the interior of the oven casing 109. A pair of tracks 111 are disposed against the outside wall of the casing 109 and respectively receive guide rollers 112 which are interconnected to the burner 110 by bracket means 113. A large negator spring 114 is attached to the oven casing 109 at the top thereof and is interconnected to the burner means 110 in the manner illustrated in FIG. 8 to not only act as a counterbalancing means therefor with upward bias but also to at least partially seal closed the slot 109A in the oven casing 109 when the burner means 110 is disposed in bake position in the oven casing 109 to prevent heat loss through such slot. A cable 115 or the like is interconnected to the burner 110 and is adapted to be wound up or unwound on a suitable pulley 116 by a negator spring 117 interconnected to a movable wall 118 of a bellows construction 119 having or not having a compression spring 120 disposed therein, the pulley 116 being fixed on a shaft 116A rotatably mounted to a fixed wall and the negator spring 117 having one end fixed to the shaft 116A. When the interior of the bellows construction 119 is interconnected to the atmosphere, the combination of the negator springs 114, 117 and compression spring 120 permits the pulley 116 to be unwound and the burner means 110 to be moved upwardly to its broil position in the oven casing 109. However, when a vacuum is imposed in the interior of the bellows construction 119, the same moves the movable wall 118 downwardly to wind up the pulley 116 and pull the burner means 110 downwardly to its bake position in the oven casing 109, the burner means 110 being held in that position as long as the bellows construction 119 is evacuated.

If desired, latching means could be provided to hold the burner means 110 in its selected position.

Another means for moving a burner means relative to the oven casing to provide broiling or baking functions therefor is illustrated in FIG. 9 wherein a burner means 121 projects through a slot in the oven casing 122 and is movable vertically upwardly and downwardly therein by pneumatic means 119 in the manner similar to that provided in the embodiment of FIGS. 7 and 8. However, in place of rollers on the burner means 121, a pair of negator springs 123 are respectively interconnected to bracket means 124 of the burner means 121 and fixed to the casing wall 122 at 125. A central roller 126 spans the slot in the casing wall 122 and engages against the interior surface thereof to guide vertical movement of the burner means 121.

Thus, when atmospheric conditions exist in the bellows construction 119 the burner means 121 is raised to the upper position in the oven casing 122 by the negator springs 123 whereby the burner means 121 provides broiling means for the oven.

However, when a vacuum is imposed in the bellows construction 119, the burner means 121 is moved vertically downwardly to a lower position in the oven casing 122 for baking purposes.

One means for automatically controlling the cooking operation of either the burner means of the ovens of the cooking apparatus 30 or the burner means for the top surface thereof is illustrated schematically in FIG. 10 wherein a vacuum regulator 127 is provided and is formed substantially in the same manner as the vacuum regulator 80 previously described except that in place of the adjusting screw 81 thereof, a plunger 128 is provided to vary the position of the movable wall 83 of the expansible element 84.

The degree of movement of the plunger 128 is adapted to be controlled by a card 129 or the like having a contoured edge 130 movable past the plunger 128 in a manner now to be described.

In particular, the card 129 has a plurality of aligned perforations 131 provided therein and engageable by a sprocket wheel 132 adapted to be rotated by a timer motor 133. The timer motor 133 has an outwardly directed shaft structure 134 interconnected to the sprocket 132 and carries a guide member 135 against which the straight side 136 of the card 129 abuts. In this manner, the particular card 129 can be disposed in its most left position whereby the plunger 128 will bear against the portion 137 of the contoured side 130 of the card 129 and will cause the regulator 127 to not direct any fuel to the burner means until the plunger 128 rides down into the portion 138 of the card 129 whereby the burner means will cook at the desired temperature controlled by the card 129. When the portion 139 of the card 129 bears against the plunger 128, the temperature effect produced by the burner means will be reduced to a noncooking but warming temperature to hold the food at a palatable temperature without further cooking thereof.

Thus, it can be seen that cards 129 can be provided for the housewife or the like to cook desired products in an automatic manner whereby the housewife can place the card 129 on the guide means 135 and turn on the timer motor 133 whereby the same will turn on the burner means at a desired time interval therefrom and cook the same for a predetermined length of time whereby the temperature effect of the burner means will be subsequently reduced to a noncooking but warming holding temperature.

In order to vary the condition produced by a particular card 129, the shaft means 134 can have an adjustment means 140 provided therein whereby the guide means 135 can be moved toward or away from the regulator 127 to change the particular temperature controlled by the card 129.

Another system of this invention for automatically controlling the cooking in an oven or the like and generally indicated by the reference numeral 141 in FIG. 11 will now be described.

As illustrated in FIG. 11, an oven casing 142 is provided and has suitable burner means 143, the burner means 143 being adapted to be supplied fuel from a fuel source conduit 143' passing through a valve means 93 previously described. The valve means 93 is adapted to be controlled by an actuator 88 previously described.

Instead of utilizing the regulator 80 previously described for operating the actuator 88 in the manner illustrated in FIG. 5, another regulator 144 is provided and parts thereof similar to the regulator 80 are indicated by like reference numerals.

The regulator 144, in place of the adjusting member 81 previously described, has a bellows construction 145 provided with a fixed end 146 attached to the housing means 50 and a movable end 147 attached to the expansible element 84, the bellows 145 normally being urged to a no vacuum position by a compression spring 148.

Thus, it can be seen that the regulator 144 is adapted to control the temperature in the oven casing 142 depending upon the setting of the bellows construction 145 in a manner hereinafter described.

The interior of the bellows construction 145 is adapted to be interconnected to a conduit means 149 having branch conduits 150 and 151 respectively leading to the regulated vacuum conduits 57 of regulators 152 and 153 formed in substantially the same manner as the regulator 48 previously described. However, the vacuum supply conduits 55 of the regulators 152 and 153 are respectively interconnected to ports 154 and 155 of a reading head 156 by conduits 157 and 158. Ports 159 and 160 are formed in the reading head 156 and are respectively interconnected to the vacuum source 46 by a conduit means 161, the conduit means 161 being interconnected to the conduit 55 of the regulator 144 for a purpose hereinafter described.

A flexible reading tape 162 is adapted to be moved relative to the reading surface 163 of the reading head 156 by means of a timer motor 164 driving a sprocket 165 receivable in perforations 166 in the tape member 162.

The tape member 162 has two rows 167 and 168 of communicating blisters 169 which are adapted to bridge various ports in the reading head 156 in the manner hereinafter described.

In addition, the tape 163 has two rows 170 and 171 of apertures 172 passing therethrough for a purpose hereinafter described.

The operation of the system 141 will now be described.

Assuming that the housewife or the like has selected a particular tape 162 illustrated in the drawings, the housewife places the tape 162 in the control device of the cooking apparatus 30 in such a manner that the leading edge 173 of the tape 162 has been threaded sufficiently past the sprocket 165 so that upon subsequent actuation of the timer motor 164, the timer motor 164 will progressively move the tape 162 from left to right at a constant speed.

Before turning on the timer motor 164, the housewife adjusts the knob 49 of the regulator 153 to select the desired cooking temperature for the oven 142. The housewife also adjusts the knob 49 on the regulator 152 to set the warming or holding temperature of the oven 142, the regulator 152 controlling the temperature of the oven 142 so that the same will be at a noncooking but warming temperature.

Thereafter, the timer motor 164 if energized so as to drive the tape 162 from left to right with a constant speed whereby it can be seen that the row 167 of blisters 169 begins to pass over and bridge the ports 155 and 160 of the reading head 156 so that the vacuum source 46 is interconnected to the regulator 153 whereby the vacuum created in the conduit 151 leading to the regulator 144 adjusts the bellows 145 so that the vacuum being supplied to the actuator 88 in the regulator 144 will cause the valve means 93 to maintain the temperature in the oven 142 at the cooking temperature selected by the knob 49.

Simultaneously, the row 170 of apertures 172 passes over the port 154 in the reading head 156 so as to prevent interconnection of the vacuum source 46 to the regulator 152, the branch conduits 150 and 151 having one way check valves disposed therein so as to prevent the flow of air through the conduit 157 and regulator 152 when the apertures 172 are aligned with the ports 154 in the reading head 156.

Thus, it can be seen that as long as the row 167 of blisters 169 are continuously bridging the ports 155 and 160, the regulator 144 will maintain the temperature in the oven 142 at a cooking temperature selected by the knob 49 of the regulator 153.

However, when the row 168 of blisters 169 begins to bridge the ports 154 and 159 of the reading head 156, it can be seen that the regulator 152 will impose a different vacuum condition on the bellows 145 to adjust the regulator 144 to maintain the temperature in the oven 142 at a noncooking but warming temperature, the vacuum source to the regulator 153 being terminated as the row 171 of apertures 172 is now aligned with the port 155 whereby air cannot flow into the conduit 149 through the regulator 153 because of the one way check valve in the branch conduit 151.

Accordingly, it can be seen that the system 141 illustrated in FIG. 11 is readily adaptable to provide means wherein food or the like can be automatically cooked in the oven 142 at the selected cooking temperature for a predetermined length of time and, thereafter, be merely warmed by the oven 142 for a predetermined length of time by means of the regulators 152, 153 and 144 in the manner previously described.

Another system for controlling the cooking conditions of an oven is generally indicated by the reference numeral 174 in FIG. 13 and is utilized to provide means whereby food can be cooked in an oven for a predetermined length of time at a cooking temperature and, thereafter, be warmed in the oven at a noncooking and holding temperature.

In particular, the system 174 illustrated in FIG. 13 includes the valve means 93 and actuator 88 for controlling the flow of fuel to the burner means (not shown) of an oven in relation to the degree of vacuum being imposed in the chamber 91 of the actuator 88, the chamber 91 of the actuator 88 being interconnected to the vacuum source 46 by a conduit means 175 having a Lear limiting orifice 175 provided therein. The conduit 175 is also interconnected to a bleed orifice 177 which has the opening thereof controlled by a flapper-type valve member 178.

The valve member 178 has one end 179 pivotally mounted by a pivot pin 180 to a rod 181 fixed to a movable wall 182 of a pneumatic bellows 183.

The lever 178 is adapted to be fulcrumed on a fulcrum point 184 of a movable wall 185 of an expansible and contractable element 186 having the interior thereof interconnected to a temperature sensing bulb 187 by a conduit 188, the temperature sensing bulb 187 being disposed in the oven for sensing the temperature thereof.

The wall 189 of the bellows 183 is fixed to a frame means 190 whereby a compression spring 191 disposed between the frame means 190 and a bracket portion 192 of the rod means 181 tends to normally urge the pivoted end 179 of the lever 178 to the right in FIG. 13 to cause the other end 193 of the lever 178 to move away from the bleed orifice 177 so that the vacuum imposed in the chamber 91 of the actuator 88 will be at a minimum and cause the valve means 93 to close.

The interior of the bellows 183 is controlled by a regulator 194, the regulator 194 being substantially the same as the regulator 48 previously described whereby like reference numerals will be utilized to indicate like parts.

However, the regulator 194, in place of the retainer 61, has a pivotally mounted lever 195 pivoted to the housing 50 by pivot means 196, the compression spring 63 being disposed between the lever 195 and the retainer 62 previously described.

The free end 197 of the lever 195 is adapted to be engaged by a cam 198 rotated about an axis 199 by a suitable timer motor (not shown).

The cam 198 is so constructed and arranged that the same is adapted to regulate the position of the diaphragm 53 in such a manner that the regulator 194 will cause a vacuum condition in the bellows 183 to position the flapper valve member 178 so that the bleed orifice 177 will permit the actuator 88 to open the valve means 93 and provide fuel to the burner means of the oven at the particular setting of the lever 195, the overshooting of the temperature of the oven being controlled by the expansible element 186 whereby the burner means of the oven will cook the food at the desired temperature as controlled by the cam 198 for a predetermined length of time.

Thereafter, the cam 198 has been rotated to such a position that it permits adjustment of the lever 195 to reduce the degree of vacuum in the chamber of the bellows 183 so that the flapper valve 178 will cause the valve means 93 to throttle down the flow of fuel to the burner means so that the burner means will only maintain the oven at a noncooking and warming temperature during the remainder of the time that the cam 198 rotates.

Therefore, it can be seen that the system 174 of this invention operates in a manner similar to the system 141 previously described to provide automatic means for controlling an oven to cook food at a desired cooking temperature for a predetermined length of time and, thereafter, causing the oven to keep the cooked food at a warming and noncooking temperature.

If desired, the force of the bellows 183 can be utilized to reposition nozzle 177 rather than the pivot of flapper 178. Also, a bias spring could be utilized to apply a compressive load to bellows 186.

Another feature of this invention is to provide means for controlling the vent opening for an oven of the cooking apparatus 30.

Figures 14, 16:
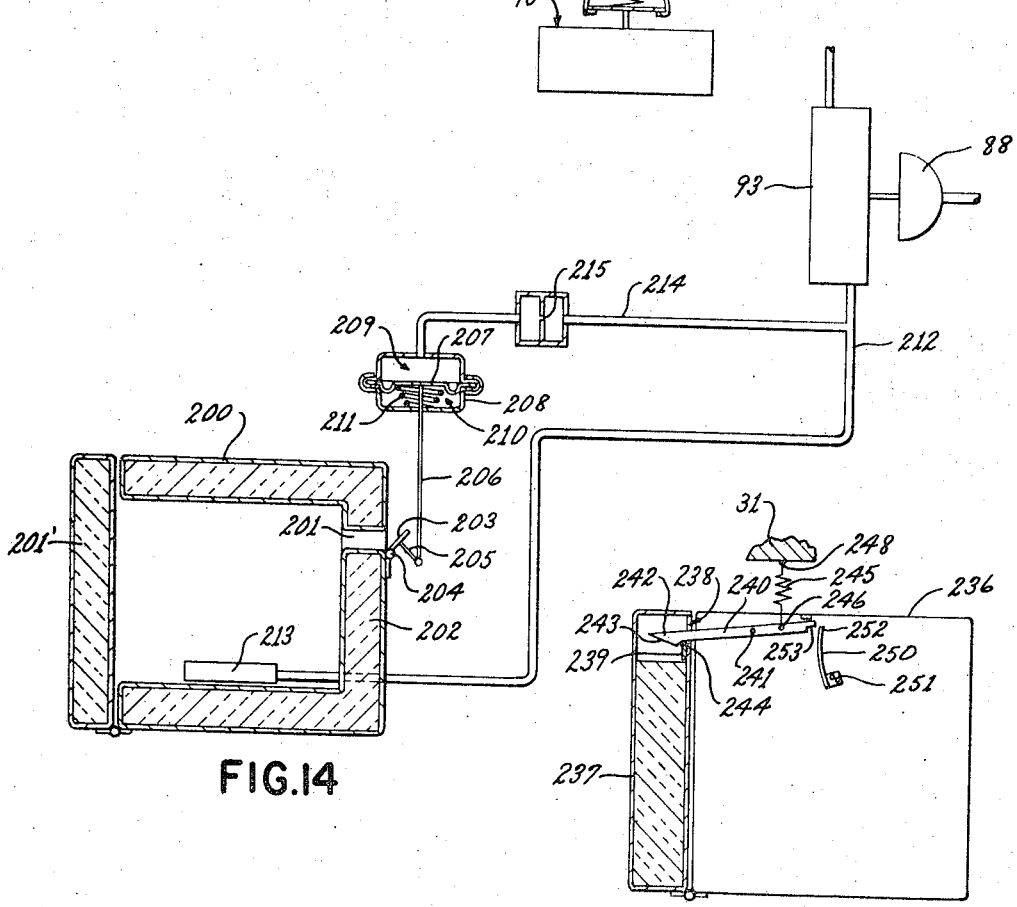
FIG. 14 is a schematic side view illustrating a vent control for the oven of the cooking apparatus of FIG. 1.
FIG. 16 is a fragmentary side view illustrating one means for latching the oven door of the cooking apparatus of FIG. 1 in its closed position.

In particular, reference is made to FIG. 14 of the drawings wherein an oven casing 200 is provided and has a door 201' for opening and closing the casing 200 in a conventional manner. However, the casing 200 has a vent opening 201 passing through the rear wall 202 thereof, the opening 201 adapted to be opened and closed by a valve member or damper 203 pivoted to the wall 202 by pivot means 204.

The valve member 203 has an arm 205 interconnected to a rod 206 fixed to a flexible diaphragm 207 dividing a casing 208 into two chambers 209 and 210.

A compression spring 211 is disposed in the chamber 210 between the casing 208 and the diaphragm 207 tending to urge the diaphragm upwardly in the drawings so as to normally close the vent opening 201.

However, the chamber 209 of the casing 208 is interconnected to the fuel supply manifold 212 of the burner means 213 for the oven 200 of a conduit means 214, the conduit means 214 having a Lear limiting orifice 215 disposed therein.

The operation of the oven 200 will now be described.

When fuel is supplied to the burner means 213 of the oven 200 by the valve means 93 being opened by the actuator 88 in the manner previously described, the pressure of the fuel in the supply manifold 212 is imposed in the chamber 209 and acts against the diaphragm 207 to tend to move the same downwardly in opposition to the force of the compression spring 211 to move the valve member 203 to an open position substantially proportional to the gas pressure in the burner manifold 212.

For example, it is known that gas flow rate will vary as the square root of the manifold pressure whereby a linear relationship between the damper opening 201 and manifold pressure will provide relatively less vent area with respect to gas rate at low pressure than at high pressure.

Accordingly, it can be seen that the amount of opening provided by the valve member 203 is proportional to the gas pressure in the manifold 212.

Means are provided by this invention for controlling the moisture in the oven of the cooking apparatus 30 of FIG. 1.

In particular, reference is made to FIG. 15 wherein an oven casing 216 is provided and has a door 217 for opening and closing the same, the oven 216 having the vent means 201, 203 of FIG. 14 if desired.

A coil of tubing 218 is disposed in the oven 216 and has the outlet 219 thereof interconnected to a conduit 220 leading to a drain. The inlet 221 of the tubing 218 is interconnected to a conduit 222 which, in turn, is interconnected respectively to a conduit 223 and to a conduit 224, the conduit 223 being interconnected to a source of hot water and the conduit 224 being interconnected to a source of cold water.

Each conduit 223 and 224 has a valve means 93 disposed therein with the valve member 98 being controlled by the pneumatic actuator 88 in the manner previously described for the embodiment of FIG. 5.

However, the vacuum source 46 which is adapted to be interconnected to the chambers 91 of the actuators 88 must first pass through branch conduits 225 and 226 respectively having valve means 93 therein.

The valve means 93 and the conduits 225 and 226 have the valve members 98 thereof interconnected together by means 227 controlled by a solenoid operated device 228. Thus, when the valve member 98 of the valve means 93 in the conduit 226 is disposed in an open position, the valve member 98 of the valve means 93 in the conduit 225 is disposed in a closed position and vice versa.

A humidity sensor 229 is disposed in the oven 216 and is adapted to control an electrical switch 230A in power lead $L^1$ by cable means 230. The humidity sensor 229 is adapted to send an electrical signal through a cable 231 to the solenoid 228 for a purpose hereinafter described. If desired, the power source $L^1$ and $L^2$ can be interconnected to an electrical heater 232 disposed around the conduit 223 downstream from the valve member 93 thereof to provide further heating of the water flowing through the conduit 223 for a purpose hereinafter described.

The coil tubing 218 is disposed in a suitable sump 233 in the oven 216, the sump 233 having an outlet 234 interconnected to a drain conduit 235 to prevent overflowing of the sump 233.

The operation of the system illustrated in FIG. 15 will now be described.

Assuming that the humidity sensor 229 of the oven 216 determines that moisture should be removed from the oven 216, the sensor 229 through the solenoid 228 causes the valve member 98 of the valve means 93 in the conduit 226 to open so that the vacuum source 46 can be interconnected to the actuator 88 of the valve means 93 in the conduit 224 to open the valve member 98 thereof.

With the conduit 224 now open, cold water is adapted to flow through the coil 218 in the oven 216 to condense the moisture out of the air in the oven 216 so that the moisture will remain in the sump 233 and eventually spill over into the outlet 234.

Conversely, should the humidity sensor 229 require that more moisture be present in the oven 216, the solenoid 228 is actuated to close the valve member 98 of the conduit 226 and to open the valve member 98 of the conduit 225 so that the valve member 98 of the valve means 93 in the conduit 223 will be open whereby hot water will be supplied to the coil 218 and heat the water in the sump 233 to evaporate the same and supply moisture in the air of the oven 216.

Thus, it can be seen that the humidity sensor 229 is adapted to maintain the humidity in the oven 216 at the proper level.

If desired, water can be added to the sump 233 so as to maintain a water level therein by means of a float valve located outside the oven. A diaphragm actuator, controlled by the oven thermostat, could override the float valve to prevent the addition of water unless the thermostat or other device called for water.

Further, the system illustrated in FIG. 15 could be utilized for chemical cleaning operations, if desired.

It may be desired to have the ovens in the cooking apparatus 30 of this invention be of the type so that the same can be automatically cleaned by raising the temperature thereof to around 800° F. or the like. However, in such burn-off oven cleaning periods, it is necessary to positively lock the oven doors in their closed positions during the elevated temperature operation.

Accordingly, some of the features of this invention are to provide such automatic latching means.

For example, reference is made to FIG. 16 wherein an oven casing 236 is provided and has a pivotally mounted door 237 for opening and closing the same. The door 237 has a slot 238 provided therein which defines a latching shoulder strike bar 239.

A latch member 240 is pivotally mounted to the casing 236 by a pivot pin 241, the latch member 240 having a latching end 242 receivable in the slot 238 and having opposed camming surfaces 243 and 244 cooperable with the shoulder 239 in a manner hereinafter described.

The latch member 240 is continuously urged in a counterclockwise latching direction by a tension spring 245 having one end 246 attached to the latch member 240 on the right side of the pivot pin 241 and another end 248 attached to the stationary casing 31.

However, even though the latch member 240 is biased to its latching position, the door 237 can be opened by pivoting the latch around its hinge point 241 whereby the shoulder 239 will act against the cam surface 244 and cam the latch member 240 in a clockwise direction to permit the latching end 242 to clear the shoulder 239.

Thus, the latch member 240 normally acts as a means to hold the door 237 in its closed position whereby the door 237 can be opened by overcoming the force of the tension spring 245.

A bimetal member 250 is mounted to the casing 236 at a point 251 whereby the free end 252 of the bimetal member 250 is free to move relative to the casing 236, the end 252 being receivable in a slot or notch 253 of the latch member 240 when the bimetal member 250 senses a temperature above a safe temperature for the opening of the door 237. For example, such temperature can be 575° F. or above.

Thus, it can be seen that when the temperature of the oven 236 exceeds 575° F. or the like, the end 252 of the bimetal member 250 is moved into the notch 253 of the latch member 240 whereby the same holds the latch member 240 in its latching position so that the door 237 cannot be opened until the bimetal member 250 has cooled sufficiently to clear the notch 253.

Accordingly, it can be seen that automatic latching means for the oven 236 is provided in FIG. 16.

Another system of this invention for automatically locking the oven door in its closed position at elevated temperatures, such as temperatures for burn-off cleaning thereof, is generally indicated by the reference numeral 254 in FIG. 17.

As illustrated in FIG. 17, an oven casing 255 is provided and has a door 256 hinged thereto at 257 for opening and closing the oven casing 255. A latch member 258 is provided and is pivoted to the casing 255 by pivot pin means 259, the latch member 258 normally being urged to its unlatched position by a leaf type spring 260.

The latch member 258 is formed of two parts 261 and 262 hinged together by pivot pin means 263 and normally held in aligned relation by a spring 264.

The portion 262 of the latch member 258 has a latching hook 265 adapted to be received in a slot 266 of the oven door 256 and be pulled behind a strike bar 267 in opposition to the force of the spring means 260 in a manner hereinafter described to latch the door 256 in its closed position. However, the strike bar 267 is movable relative to the door 256 so that the same could be moved out of the way of the hook end 265 of the latch member 258 in an emergency operation to open the door 256. Thereafter, should it be desired to reclose the door with the member 258 in its latching position, the front portion 262 of the latch member 258 can cam against the strike bar 267 and cause the portion 262 to pivot about the point 263 to clear the strike bar 267 and, thereafter, by means of the spring 264 move back into its latching position.

In addition, the latch member 258 has an arm 269 provided with a notch 270 which is adapted to receive a free end 271 of a bimetal latch member 272 when the temperature in the oven 255 exceeds approximately 575° F.

Thus, the bimetal 272 will hold the latch member 258 in its latching position as long as the temperature in the oven 255 is above 500°.

The means for moving the latch member 258 to its latching position in opposition to the force of the spring 260 will now be described.

The control device 273 for controlling the temperature of the oven 255 includes a housing 274 provided with a splined bore 275 receiving an axially movable retainer 276 splined in the bore 275, the retainer 276 having a threaded bore 277' receiving a threaded adjusting member 277. The threaded adjusting member 277 carries a control knob 278 on one end thereof and has the other end 279 thereof receivable in a recess 280 of a retainer 281 attached to one wall 282 of an expansible and contractible element 283 which has the interior thereof interconnected to a sensing bulb 284 disposed in the oven 255 by a conduit 285.

The movable wall or portion 286 of the expansible element 283 is adapted to bear against a flapper valve member 287 pivoted to the housing 274 by a pivot pin 288 whereby the free end 289 of the lever 287 is adapted to be pivotally moved relative to a bleed orifice 290 in a conduit 291, the lever 287 being urged to a position to close the bleed orifice 290 by a compression spring 292.

The burner means (not shown) for the oven 255 is adapted to be fed fuel through a conduit 293 leading to a valve means 294 having a cock valve 295 disposed therein to interconnect the conduit 293 to an inlet chamber 296 of the valve means 294. The inlet chamber 296 of the valve means 294 is interconnected to an outlet chamber 297 by a valve seat 298, the outlet chamber 297 being interconnected to the burner means by a conduit 299. The valve seat 298 is adapted to be opened and closed by a valve member 300 carried on a flexible diaphragm 301 normally urged to its valve seat closing position by a compression spring 302, the diaphragm 301 cooperating with a casing 303 to define a chamber 304.

The chamber 304 is adapted to be interconnected to the vacuum source 46 by a conduit means 305 having a Lear limiting orifice 306 therein, the conduit 305 also being interconnected to the conduit 291 previously described.

The axially slidable member 276 of the control device 273 is normally urged to the right by a compression spring 307. A collar 276A which is locked onto member 276 by a setscrew holds the member 276 in the full line position illustrated in FIG. 17 against movement urged by spring 307. The control knob 278 is disposed behind a flange 308 of the housing 274. However, when the control knob 278 is turned to a temperature of 600° F. or above, the knob 278 can be pulled leftwardly by having a slot means 309 thereof clear the flange 308 whereby the slidable member 276 can be moved to the left and be latched in its pulled out position by a latch member 310 being received in a notch 311 thereof. The latch member 310 is normally urged to its unlatching position by a compression spring 311' and is pivotally interconnected to a lever 312 by a pivot pin 313. The lever 312 is pivotally mounted to the housing 274 by a pivot pin 314.

Another lever 315 is pivotally mounted to the housing 274 by a pivot pin 316. The lever 315 is interconnected to the lever 312 by a tying means 317 for a purpose hereinafter described.

The lever 315 carries a pair of plungers 318 and 319 respectively received in bores 320 and 321 of a housing 322. The plungers 318 and 319 are urged downwardly by compression springs 323 and 324. The lever 315 has the end 325 thereof continuously urged in a counterclockwise direction by a tension spring 326. With the lever 315 being biased by the spring 326, the plunger 318 is so constructed and arranged that it closes a ball valve 327 against a valve seat 328 to prevent interconnection between a conduit 329 and a conduit 330, the conduit 329 being interconnected to the conduit 305 and the conduit 330 being interconnected to a chamber 331 of an actuator 332 including a housing 333 and a flexible diaphragm 334 normally urged downwardly by a compression spring 335. The flexible diaphragm 334 of the actuator 332 is interconnected to the latch member 258 by a tying means 336 having a tension spring 337 therein for a purpose hereinafter described.

With the lever 315 disposed in the position illustrated in FIG. 17 by the spring means 326, the plunger 319 permits a ball valve 338 to be unseated from a valve seat 339 to interconnect together a branch conduit 340 and a conduit 341, the branch conduit 340 being interconnected to the conduit 330 and the conduit 341 being interconnected to the atmosphere whereby when the lever 315 is disposed in the position illustrated in FIG. 17, the chamber 333 of the actuator 332 is interconnected to the atmosphere and the force of the springs 335 and 260 is sufficient to move the latch member 258 to its unlatching position for normal cooking in the oven 255.

The conduit 291 is interconnected by a branch conduit 342 to a chamber 343 of an actuator 344 comprising a housing 345 and a flexible diaphragm 346, the flexible diaphragm 346 being interconnected to the lever 312 by a means 347.

The operation of the system 254 illustrated in FIG. 17 will now be described.

With the gas cock valve 295 disposed in the open position, the operator of the system 254 moves the control knob 278 to the desired temperature setting for the oven 255 whereby the parts of the system will be disposed in the position illustrated in FIG. 17 with the latch member 258 being held in its open position by the spring 260 as the chamber 331 of the actuator 332 is interconnected to the atmosphere through the open ball valve 338. However, the vacuum created in the chamber 304 of the valve means 294 causes the valve member 300 to move to the open position thereof so that the source of fuel can flow to the burner means for the oven 255, the amount of opening of the valve member 300 being dependent upon the position of the flapper valve 287 relative to the bleed orifice 290 whereby the normal operation of the oven 255 is controlled by the temperature sensing bulb 284 expanding and contracting the element 283 in relation to the temperature sense so that the temperature in the oven 255 will remain at the selected temperature as selected by the knob 278.

However, when it is desired to clean the oven 255 by elevating the temperature thereof above 600°, the operator turns the knob 278 to the high temperature setting thereof whereby the knob 278 can be pulled to the left and slide the retainer 276 to a position wherein the latch member 310 can be received in the notch 311 thereof, the latch member 310 being urged upwardly by having the chamber 343 of the actuator 344 evacuated as the same is interconnected to the conduit 291 by the branch conduit 342. With the latch member 310 moved to its up position to be received in the notch 311 of the sliding member 276, the lever 312 is pivoted in a clockwise direction about the pivot point 314 to pull the end 325 of the lever 315 upwardly in a clockwise direction about the pivot point 316 whereby the ball valve 338 is moved against the valve seat 339 and the ball valve 327 is adapted to open the valve seat 328. With the ball valve 338 disposed in its closed position, the atmosphere is disconnected from the chamber 331 of the actuator 332 and the vacuum source 46 is interconnected thereto by the opened valve seat 328 whereby the latch member 258 is pulled upwardly by the actuator 332 into its latching position for the door 256.

Thus, it can be seen that when the slidable member 276 is moved to the left, the temperature control element 283 is also moved to the left therewith whereby the valve member 287 can close the bleed orifice 290 to provide for continuous opening of the valve means 294 to provide sufficient heat in the oven 255 for cleaning thereof. Further, it can be seen that when the temperature of the oven 255 exceeds 500° F. or the like, the bimetal member 272 has the end 271 thereof received in the notch 270 of the arm 269 of the latch member 258 to hold the latch member 258 in its latching position until the temperature of the oven falls below 500° F. or the like.

The termination of the cleaning (burn-off) period is automatic. In particular when the temperature sensed by the bulb 284 has increased to a preselected value for which the bulb 284, expansible bellows 283 and flapper valve 287 have calibrated the expansion of the bellows 283 will lift flapper 287 off the bleed orifice 290 reducing the vacuum in actuator 344 allowing spring 311' to withdraw latch member 310 from notch 311. Member 276 then moved to the right until collar 276A bears against the mating face of member 274 thus returning the setting of the thermostat to approximately 575° F. and moving the dial 278 to the right so that the dial 278 can be turned to the off position or to any intermediate temperature setting available on the temperature control device.

When the latch member 310 moves downwardly, it pivots the lever 312 in a counterclockwise direction about the pivot point 314 so that the lever 315 can also pivot in a counterclockwise direction to return the ball valve 327 against its valve seat 328 and open the valve seat 339 so that atmosphere can return to the actuator 332 and permit the latch member 258 to return to its unlatching position by the force of the spring 160 when the end 271 of the bimetal member 272 moves out of the notch 270 thereof when the temperature of the oven is below 500° F. or the like.

Therefore, it can be seen that the system 254 of this invention provides improved means for providing normal cooking in the oven 255 as well as means for burn-off cleaning thereof with safety features holding the door 256 in its closed position during the elevated temperatures of the oven 255.

Figure 19:
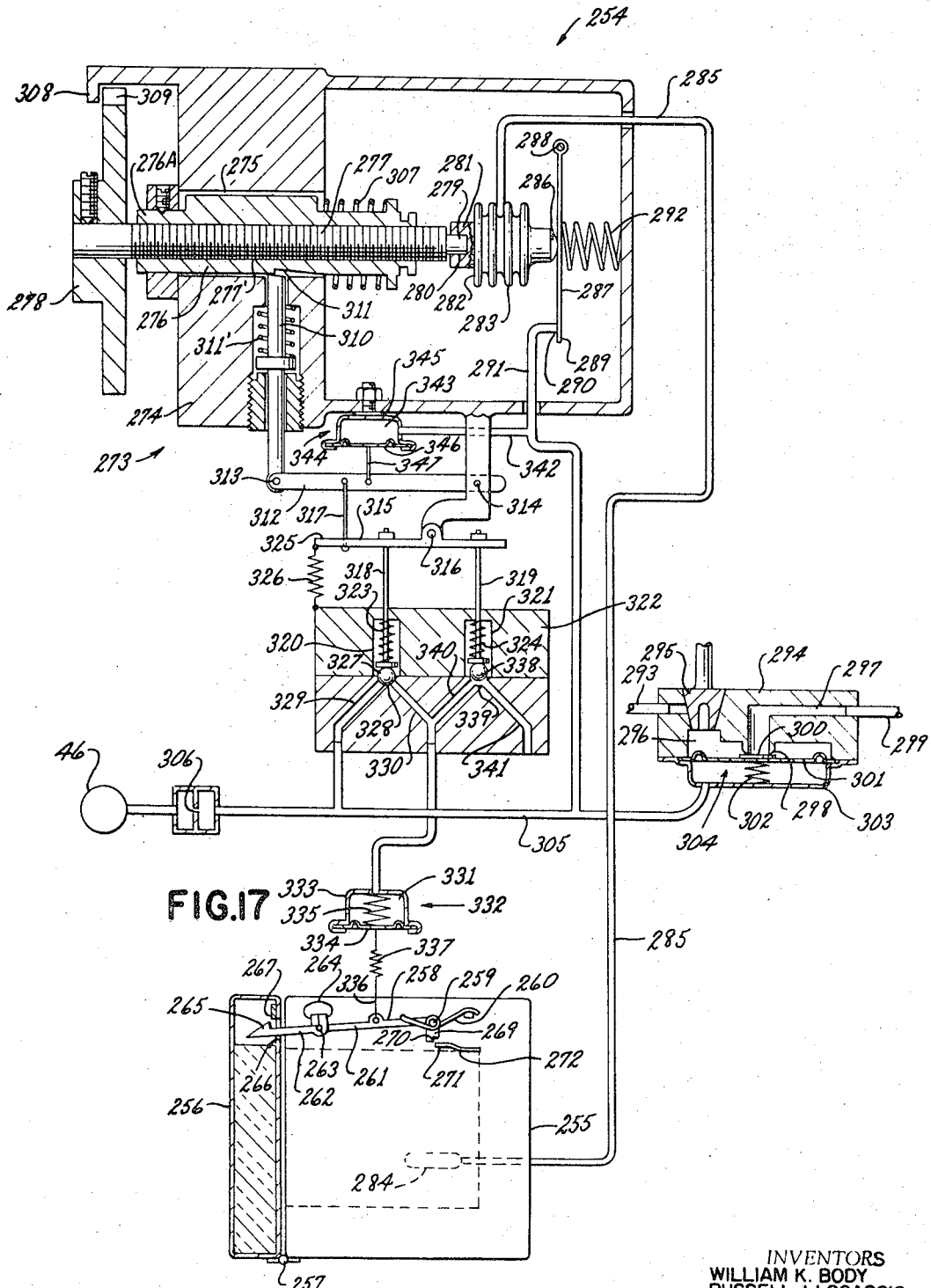
FIG. 19 is a front view of the control knob of the structure illustrated in FIG. 18.

Another system of this invention for automatically controlling the latching of an oven door in its closed position during burn-off cleaning thereof is generally indicated by the reference numeral 348 in FIGS. 18 and 19 and will now be described.

As illustrated in FIG. 18, an oven casing 349 is provided and has a door 350 for opening and closing the same, the door being pivoted to the casing 349 by pivot means 351.

A latch member 352 is provided and is pivoted to the casing 349 by a pivot pin 353, the latch member 352 having a hook-shaped end 354 receivable in a slot 355 of the door 350 and being adapted to be moved behind a strike bar 356 of the door 350 to latch the same in a closed position in a manner hereinafter described. The latch member 352 is normally urged to the unlatched position thereof by a leaf type spring 357.

The latch member 352 is adapted to be moved to its latching position by a pneumatic actuator 358 comprising a housing 359 and a flexible diaphragm 360 cooperating with the housing 359 to define a chamber 361 therebetween, the flexible diaphragm 360 being interconnected to the lever 352 by means 362 having a tension spring 363 therein. The spring 363 is properly calibrated to work in cooperation with the movement of diaphragm 360 and leaf spring 357.

The oven 349 is provided with a conventional temperature selecting knob 364 which will control the temperature of the oven 349 in any of the manners previously described or the like. However, the knob 364 has a flange portion 365 projecting therefrom which will abut against a pushbutton 366 when the knob 364 is moved to a temperature setting thereof of approximately 600° F. whereby the knob 364 cannot be turned to an oven clean-off temperature without having the pushbutton 366 first pushed inwardly in the manner illustrated in FIG. 18.

The pushbutton 366 is receivable in a bore 367 of a housing 368 and is normally urged to its out position by a compression spring 369. The pushbutton 366 is interconnected by substantially rigid means 370 to a lever 371 pivoted to the housing 368 by a pivot pin 372. The lever 371 is normally urged in a clockwise manner about the pivot point 372 by a tension spring 373. The lever 371 is interconnected to a pair of plungers 374 and 375 receivable in bores 376 and 377 of a housing 378 and normally urged in a direction to the right by compression springs 379 and 380. However, with the lever 371 disposed in the position illustrated in FIG. 18 whereby the pushbutton 366 is in its out position, the plunger 375 closes the ball valve 381 against a valve seat 382 to prevent interconnection between a conduit 383 and a conduit 384, the conduit 383 being interconnected to the vacuum source 46 while the conduit 384 is interconnected to the chamber 361 of the actuator 358.

With the pushbutton 356 in its out position, the plunger 374 permits the ball valve 385 to open a valve seat 386 to interconnect a branch conduit 387 to a conduit 388, the branch conduit 387 being interconnected to the conduit 384 and the conduit 388 being interconnected to the atmosphere.

The operation of the system 348 illustrated in FIGS. 18 and 19 will now be described.

As long as the control knob 364 is disposed in the normal cooking temperature range positions thereof, the plunger 366 is in its out position as illustrated in FIG. 18 whereby the ball valve 385 is in its open position and the ball valve 381 is in its closed position so that the atmosphere is interconnected to the chamber 361 of the actuator 358 and permits the latch member 352 to be disposed in its unlatching position whereby the door 350 of the oven 349 can be opened and closed as desired.

However, when the operator desires to clean the oven 349 by creating an elevated temperature therein, the operator pushes in on the button 366 so that the control knob 364 can be rotated to a temperature above 600° F. With inward movement of the plunger 366, the flange 365 of the control knob 364 clears the same and holds the plunger 366 in its in position. In particular, when button 366 is depressed, the control knob 364 can be rotated to the burn-off position thereof and when in this position, the flange 365 will hold button 366 depressed.

With the plunger 366 moved to its in position, the lever 371 is pivoted in a counterclockwise direction about its pivot point 372 in opposition to the force of the tension spring 373 whereby the ball valve 385 seats against the valve seat 386 and the ball valve 381 opens the valve seat 382. In this manner, the vacuum source 46 is now interconnected to the chamber 361 of the actuator 358 whereby the diaphragm 360 moves upwardly and pulls the latch member 352 into its latching position in opposition to the force of the spring 357 whereby the oven door 350 is held in its latched position by the latch member 352 as long as the control knob 364 is disposed in a temperature setting position above 600° F.

If desired, the latch member 352 can be held in its latching position by a bimetal member 272 in the manner previously described for the system 254 of FIG. 17.

Figure 20:
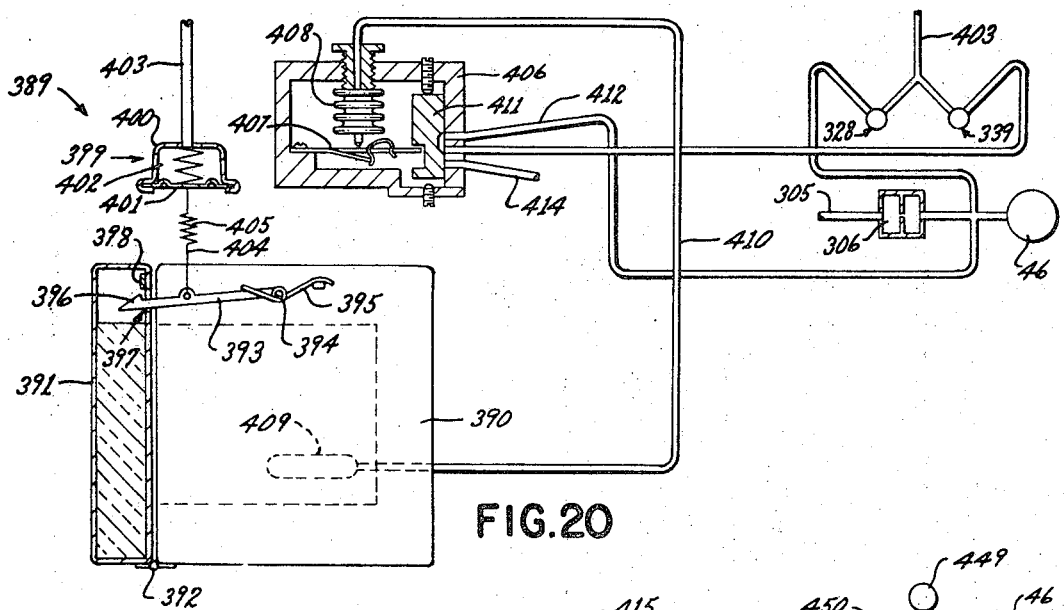
FIG. 20 is a view similar to FIG. 17 and illustrates another embodiment of this invention.

In order to provide means for delaying the unlocking of the safety latch on the oven door until the oven temperature has fallen to a safe temperature, the system 389 illustrated in FIG. 20 can be utilized wherein parts similar to the system 254 are indicated by like reference numerals.

As illustrated in FIG. 20, an oven casing 390 is provided and has a door 391 for opening and closing the same, the door 391 being pivoted to the casing by a hinge means 392.

A latch member 393 is pivotally mounted to the casing 390 by a pivot pin 394 and is normally urged to the unlatching position by a leaf spring 395, the latch member 393 having a hook-shaped end 396 receivable in a slot 397 of the door 391 and movable behind a strike bar 398 thereof when the latch member 393 is pivoted in a clockwise direction by an actuator 399.

The actuator 399 is similar to the actuator 332 of FIG. 17 and comprises a housing 400 and a flexible diaphragm 401 cooperating therewith to define a chamber 402 therebetween adapted to be interconnected to a vacuum source by a conduit 403 when it is desired to clean the oven 390 by an elevated temperature therein. The diaphragm 401 of the actuator 399 is interconnected to the lever 393 by means 404 having a tension spring 405 therein.

Therefore, it can be seen that the door 391 of the oven 390 is adapted to be latched in its closed position by the latch member 393 when the chamber 402 of the actuator 399 is evacuated in any of the manners previously described.

However, any safety latch operated and held only by vacuum signal, controlled only by the vacuum signal to the burner, unlatches the door as the burner is turned off at the end of a timer controlled interval.

The device shown in FIG. 20 will keep the oven door 391 latched after the burner is turned off at the conclusion of the heating period and unlatch it at the lower oven temperature for which the device is calibrated.

For example, a casing 406 is provided and has a snap action member 407 therein which is controlled by an expansible and contractible element 408 in a conventional manner for snap acting switch means. The interior of the bellows of the element 408 is interconnected to a temperature sensing bulb 409 by a conduit 410, the bulb being adapted to sense the temperature in the oven 390.

The snap action member 407 of the housing 406 is adapted to slide a valve member 411 having a recess for selectively interconnecting line 412 to line 413 or line 413 to line 414. Line 412 leads to the vacuum source 46 of FIG. 17 while line 413 leads to one side of the ball valve 339 of FIG. 16, line 414 leading to the atmosphere.

When the system is turned to the oven burn-off position thereof, the ball valve 328 opens and interconnects the vacuum source 46 to the actuator 399 to latch the door 391 in its closed position.

When the temperature of the oven exceeds a safe limit, the bellows 408 has expanded to such a degree that the snap member 407 moves the valve member 411 to bridge the lines 412 and 413.

Thus should the main burner be turned off whereby the ball valve 328 will close and ball valve 339 will be opened, the device 406 keeps the actuator 399 evacuated, and, thus, in its door latched position until the temperature of the oven falls below the safe limit whereby the bellows collapses sufficiently to cause the snap member 407 to move the valve 411 to interconnect the lines 413 and 414. Thus, the actuator is now interconnected to the atmosphere whereby the latch member 393 can move to its unlatching position.

Figure 21:
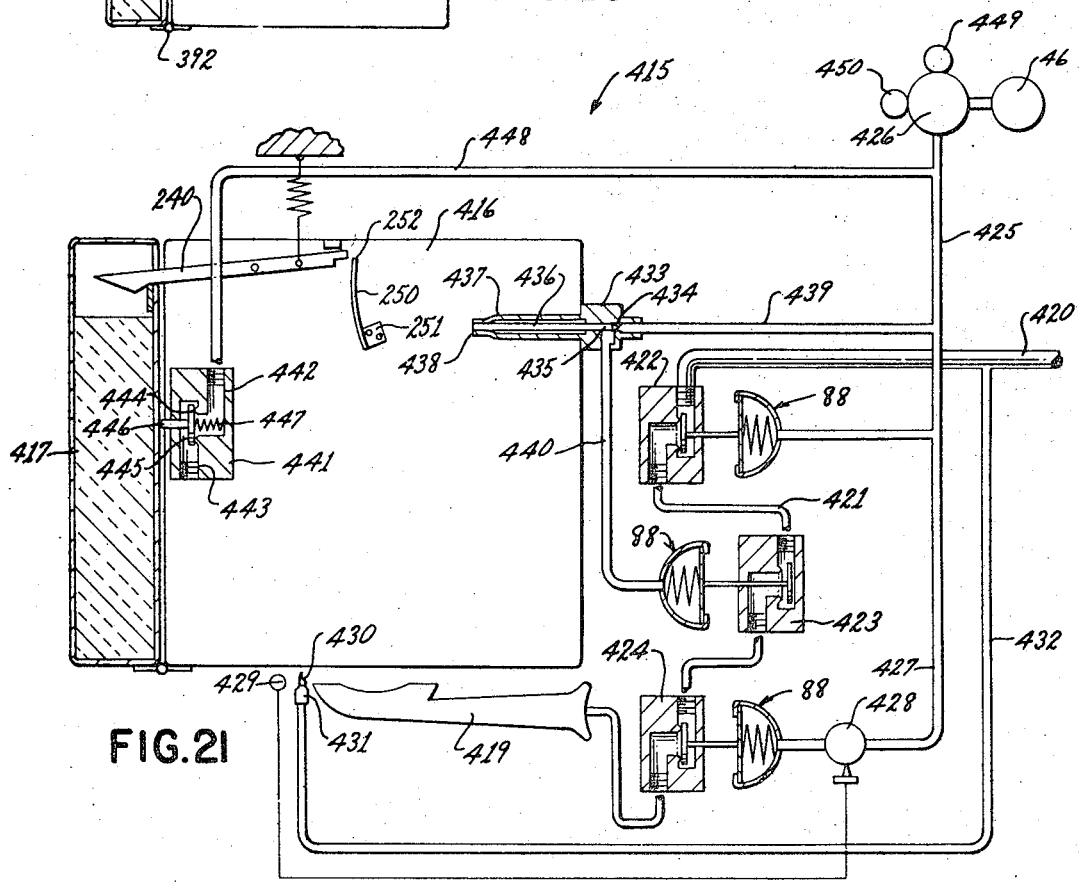
FIG. 21 is a view similar to FIG. 16 and illustrates another embodiment of this invention.

Another burn-off oven cleaning system of this invention is generally indicated by the reference numeral 415 in FIG. 21 and comprises an oven casing 416 having a door 417 hinged thereto by hinge means 418. The door means 417 is adapted to be latched in its closed position by a latch member 240 in the same manner as provided in the embodiment illustrated in FIG. 16.

The oven 416 is provided with a gas burner means 419 interconnected to a gas manifold or fuel supply means 420 by a conduit 421, the conduit 421 having three valve means 422, 423 and 424 therein downstream from the manifold 420 with the valve means 422, 423 and 424 being substantially identical to the valve means 93 previously described or the valve means 294 previously described.

In any event, the valve means 422, 423 and 424 have pneumatic actuators 88 for opening and closing the valve members thereof. However, the valve means 422 and 424 are normally closed valve means whereby a pneumatic vacuum signal is required to open the valve members thereof whereas the valve member 423 is a normally open valve means and requires a vacuum signal to the actuator 88 thereof to close the same.

A source of vacuum 46 is interconnected to the actuator 88 to the valve means 422 by a conduit 425, the conduit 425 having program controlled valve means 426 disposed therein for interconnecting the source of vacuum 46 to the actuator 88 when the program means 426 is in a proper position thereof.

A branch conduit 427 is interconnected to the conduit 425 and leads to the actuator 88 of the valve means 424. However, a solenoid operated valve member 428 is disposed in the line 427 and will not interconnect the vacuum source 46 with the actuator 88 of the valve means 424 unless a temperature sensing bulb 429 senses that a flame 430 exists at the pilot burner 431, the pilot burner being supplied fuel from a manifold 420 by the conduit means 432. Alternately, the bulb 429 could control the valve means 428 by fluid pressure, if desired.

A housing 433 is connected to the oven casing 416 and has a valve seat 434 opened and closed by the end 435 of a rod 436 disposed in a thermostat tube 437 and interconnected to the end 438 thereof. The valve seat 434 of the housing 433 interconnects a conduit 439 with a conduit 440, the conduit 439 leading to the conduit 425 and the conduit 440 leading to the actuator 88 of the valve means 423.

A switch housing 441 is carried by the casing 416 and has a passage 442 interconnected to the atmosphere by passage means 443 by means of a valve seat 444. The valve seat 444 is adapted to be opened and closed by a valve member 445 having a stem 446 adapted to be engaged by the door 417 when in the closed position, the door 417 when in the closed position engaging against the plunger 446 to close the valve member 445 against the valve seat 444 in opposition to the force of the compression spring 447. The passage 442 of the housing 441 is interconnected to the conduit 425 by a conduit 448.

The operation of the system 415 of this invention will now be described.

When it is desired to clean the oven 416, the door 417 is moved to its closed position wherein the latch member 240 holds the door 417 in its closed position. The operator then turns a manual control knob 449 to position the programmer 426 in the proper position to interconnect the vacuum source 46 to the conduit 425, the program member 426 interconnecting the vacuum source 46 to the conduit 425 during a period of time determined by a timer motor 450.

Since the door 417 is in its closed position, the valve member 445 is against the valve seat 444 whereby the conduit 448 is not interconnected to the atmosphere so that the vacuum source 46 can actuate the actuators 88 of the valve means 422 and 424 to interconnect the source of fuel 420 to the burner means 419, the valve means 424 only being opened if a flame 430 exists at the pilot burner 431 in view of the valve means 428. Thus, the burner means 419 is operating to elevate the temperature of the oven 416 to burn off the foreign particles therein. However, if the temperature of the oven 416 exceeds a predetermined temperature, the tube 437 has expanded to such an extent that it carries the rod 436 therewith to open the valve seat 434 whereby the vacuum source 46 is interconnected to the actuator 88 of the valve means 423 and closes the same to terminate the supply of fuel to the burner means 419 until the temperature of the oven 416 falls below the predetermined temperature whereby the valve means 423 is again opened by means of the thermostatic means 436, 437.

Therefore, it can be seen that by the sequential opening and closing of the valve seat 434 by means of the temperature sensing means 437, 436, the temperature in the oven 416 will be maintained at a selected elevated temperature for proper burn-off cleaning thereof.

After the programmer 426 has been turned to the proper position by the timer motor 450, the source of vacuum 46 is disconnected from the conduit 425 whereby the valve means 422 and 424 return to their closed position to terminate the supply of fuel to the burner means 419.

If at any time during the burn-off cleaning operation described above, someone should open the door 417, it can be seen that the valve seat 444 will be opened whereby atmosphere will be permitted to enter the conduit 425 to automatically turn off the valve means 423 and 424.

One feature of this invention is to provide an improved system for operating a rotisserie in one of the oven portions of the cooking apparatus 30 of this invention.

Figure 22:
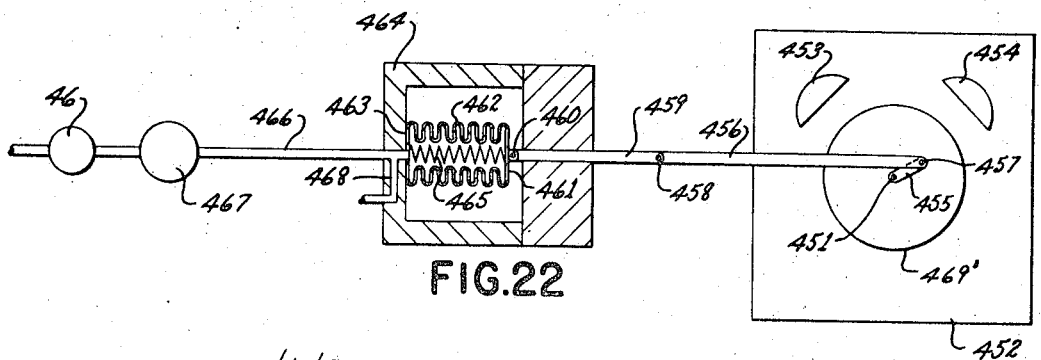
FIG. 22 is a fragmentary schematic view illustrating one means of this invention for controlling a rotisserie in the oven of the cooking apparatus of FIG. 1.

For example, reference is made to FIG. 22 wherein a rotisserie 451 is mounted in the oven casing 452, the oven casing 452 having suitable burner means 453 and 454 mounted therein.

The rotisserie 451 is adapted to rotate about its longitudinal axis and is interconnected to a lever 455 pivotally mounted to a shaft 456 by a pivot pin 457. The shaft 456 is in turn pivotally mounted by a pivot pin 458 to a link 459 pivotally mounted by a pivot pin 460 to a movable wall 461 of a bellows construction 462. The other end 463 of the bellows 462 is fixed to a stationary housing 464 and has a compression spring 465 disposed therein normally tending to hold the rotisserie 451 in the rotational position illustrated in FIG. 22.

However, the interior of the bellows construction 462 is interconnected to a conduit 466 having a programmer 467 therein to sequentially interconnect the vacuum source 46 to the conduit 466, the conduit 466 having a bleed conduit 468 interconnected thereto.

Thus, each time the programmer 467 interconnects the vacuum source 46 to the conduit 466, the bellows construction 462 collapses whereby the movable wall 461 moves toward the fixed wall 463 in opposition to the force of the compression spring 465 to partially rotate the rotisserie 451 in a counterclockwise direction whereby the meat 469' or the like mounted on the rotisserie 451 will be moved relative to the burner means 453 and 454. However, when the programmer 467 disconnects the vacuum source 46 from the conduit 466, atmosphere is adapted to return to the bellows construction 462 by means of the bleed passage 468 whereby the spring 465 expands the bellows construction 462 and causes the rotisserie 451 to move back to the position illustrated in FIG. 22.

Thus, by sequentially interconnecting and disconnecting the vacuum source 46 from the bellows construction 462, the meat 469' is moved relative to the burner means 453 and 454 with a flip-flop motion.

Figure 23:
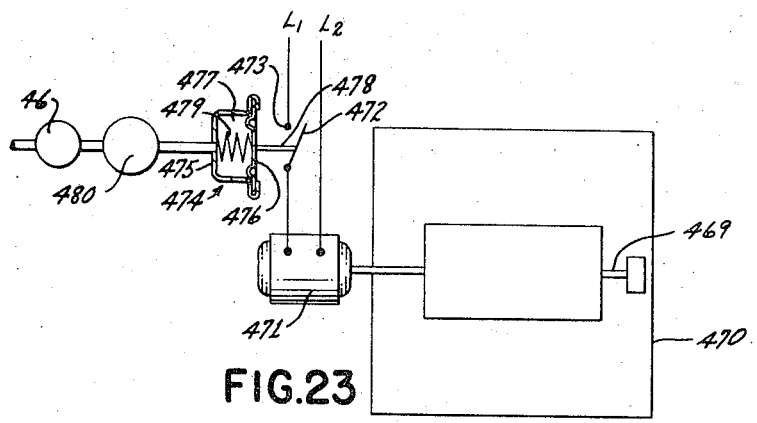
FIG. 23 is a view similar to FIG. 22 and illustrates another embodiment of this invention.

Another means for rotating the rotisserie of one of the ovens of this invention is set forth in FIG. 23 wherein a rotisserie 469 is mounted in an oven casing 470, the rotisserie 469 being adapted to be continuously rotated in one direction or oscillated by an electric motor 471, the electric motor 471 being adapted to receive electrical current from power leads $L^1$ and $L^2$.

However, the lead $L^1$ has a movable switch blade 472 provided therein which is adapted to close the lead $L^1$ when the switch blade 472 is moved to make contact with the contact 473.

The switch blade 472 is adapted to be moved between its closed and open positions by a pneumatic actuator 474 comprising a housing 475 and a flexible diaphragm 476 cooperating therewith to define a chamber 477. The flexible diaphragm 476 is interconnected to the switch blade 472 by linkage means 478 and is normally urged to a switch blade open position by a compression spring 479 disposed in the chamber 477 in the actuator 474.

A vacuum source 46 is adapted to be interconnected to the chamber 477 of the actuator 474 upon opening of a valve means 480 whereby when the vacuum source 46 is interconnected to the chamber 477 of the actuator 474, the diaphragm 476 is moved to the left to close the switch blade 472 against the contact 473 so that the electric motor 471 can drive the rotisserie 469 continuously in one direction or oscillate the same depending upon the particular motor 471 being utilized.

When the means 480 disconnects the vacuum source 46 from the actuator 474, the diaphragm 476 returns to the right under the influence of the compression spring 479 whereby the switch blade 472 is moved to an open position thereof to terminate the operation of the motor 471.

It is to be understood that other pneumatic means can be utilized to operate the rotisserie. For example, steppers, bellows operated ratchet, etc., can be utilized.

Figure 24:
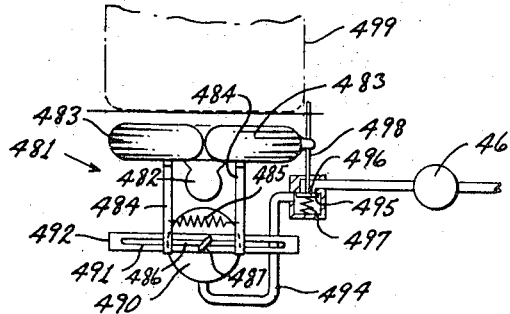
FIG. 24 is a schematic view illustrating one embodiment of this invention for controlling the top burner means of the cooking apparatus of FIG. 1.
Figure 25:
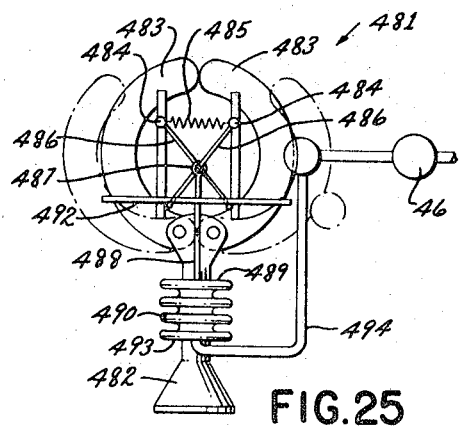
FIG. 25 is a bottom view of the structure illustrated in FIG. 24.

Referring now to FIGS. 24 and 25, an improved system 481 of this invention is provided for controlling the top burner means 33 of the cooking apparatus 30 of FIG. 1.

In particular, the system 481 includes a burner manifold 482 mounted to the frame means 31 and being fluidly interconnected to a pair of burner portions 483 respectively pivotally mounted to the manifold 482 in any suitable manner.

The burner portions 483 respectively have depending flangelike portions 484 interconnected together by a tension spring 485 whereby the tension spring 485 tends to hold the sections 483 closely adjacent each other in the manner illustrated in full lines in FIG. 25.

However, a pair of rods or links 486 are respectively interconnected to the flange portions 484 of the burner sections 483 and pass through an eyelet 487 interconnected to a rod 488 interconnected to a movable wall 489 of a pneumatic bellows construction 490. The other ends of the rod 486 are respectively received in a slot 491 of a guide bar means 492.

The fixed wall 493 of the bellows 490 is 490 interconnected to a conduit 494 having a valve seat 495 therein, the conduit 494 being adapted to be interconnected to a vacuum source 46. However, the valve seat 495 is normally closed by a valve member 496 urged to the closed position by a compression spring 497. The valve member 496 has a valve stem 498 extending therefrom which normally projects above the burner sections 483 when the valve member 496 is disposed in its closed position.

Thus, when a receptacle 499 is placed on the burner sections 483, and the receptacle 499 extends outwardly beyond the sections 483, the bottom of the receptacle 499 pushes downwardly on the stem 498 and causes the valve member 496 to move to an open position whereby the vacuum source 46 is interconnected to the bellows construction 490. As long as the vacuum 46 is interconnected to the bellows 490, the movable wall 489 moves downwardly toward the fixed wall 493 whereby the linkage means 486 cause the burner sections 483 to pivot outwardly relative to the manifold 482 until the stem 498 clears the receptacle 499 and moves to its closed position by means of the compression spring 497.

In this manner, the burner sections 483 are automatically adjustable to any size receptacle 499 within the limits of the pivotal movement of the burner sections 483 relative to the manifold 482.

Another top burner control means of this invention is generally indicated by the reference numeral 500 in FIG. 26 and will now be described.

Figure 26:
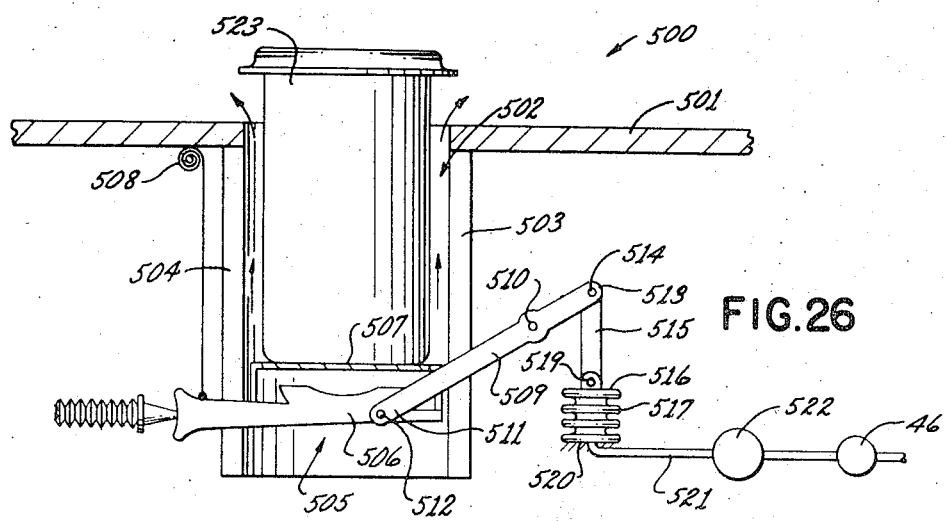
FIG. 26 is a fragmentary, cross-sectional view illustrating another embodiment of this invention for controlling the top burner means of the cooking apparatus of FIG. 1.

As illustrated in FIG. 26, the frame means 31 of the cooking apparatus 30 is provided with a top surface 501 having a well 502 surrounded by a heat shield 503.

A slot 504 is provided in the heat shield 503 and through which a burner means 505 projects into the well 502, the burner means 505 concluding a burner 506 and a receptacle receiving and supporting plate 507 suitably interconnected together.

The burner 506 is interconnected to a negator spring 508 which tends to counterbalance the weight of the burner means 505.

The lever 509 is pivotally mounted to the frame means 31 by a pivot pin 510 whereby the end 511 of the lever 509 is pivotally interconnected to the burner means 505 by a pivot pin 512.

The other end 513 of the lever 509 is pivotally interconnected by a pivot pin 514 to a link 515 pivotally interconnected to a movable wall 516 of a bellows construction 517 by a pivot pin 519.

The other end 520 of the bellows construction 417 is fixed relative to the frame means 31. The interior of the bellows construction 517 is interconnected to the vacuum source 46 by a conduit 521, the conduit 521 having a suitable on-off valve 522 therein.

The operation of the system 500 will now be described.

A suitable pot or receptacle 523 is adapted to be disposed on the burner plate 507 and the position of the plate 507 relative to the surface 501 can be controlled by the pneumatic actuator 517. For example, should it be desired to raise the plate 507 to the position illustrated in FIG. 26 or to a higher position, the valve 522 is opened sufficiently to permit the bellows 517 to be interconnected to the vacuum source 46 and be collapsed so as to pivot the lever 509 about the pivot point 510 to raise the burner means 505 to the desired level whereby the valve 522 is then closed.

Thus, it can be seen that by partially evacuating the bellows construction 517, the burner means 505 can be positioned in the desired position relative to the top surface 501 of the cooking apparatus 30.

In this manner, the adjustable burner means 505 will permit well cooking using any depth of pan and will conserve fuel because a more uniform heat is provided to the receptacle 523 by the well means 502. Further, the burner means 505 can convert to a surface unit when required for frying, etc.

However, when the burner means 505 is utilized in a well, the same will maintain the top of the range clear and provide less probability of accidents. In addition, the burner means 505 can be utilized as part of the top of the range or cooking apparatus 30 to provide greater flat work surface therefor.

When the well 502 is utilized, it can be seen that it is easier to view inside the receptacles 523 when the same are in their lowered position.

Figure 27:
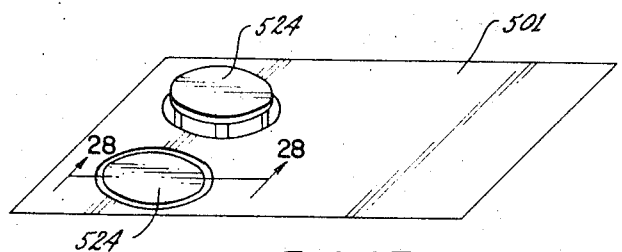
FIG. 27 is a fragmentary perspective view of the top surface of the cooking apparatus of FIG. 1.
Figure 28:
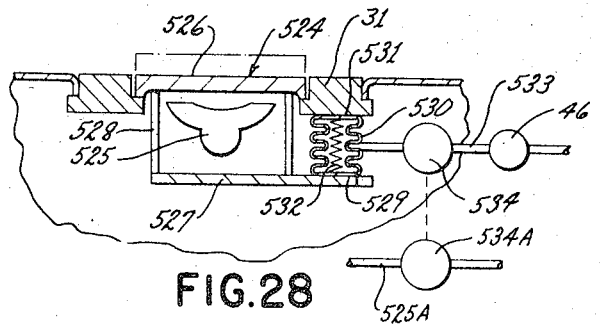
FIG. 28 is a cross-sectional view taken on line 28–28 of FIG. 27.

Referring now to FIGS. 27 and 28, the top surface 501 of the cooking apparatus 30 can be provided with pot supports 524 which are movable relative to the surface 501 and relative to the burner means 525, each pot support 524 including a flat plate 526 interconnected to plate means 527 by supports 528. The support plate 527 is interconnected to one end 529 of a bellows construction 530 with the other end 531 of the bellows construction 530 being fixed to the frame means 31 of the cooking apparatus.

The interior of the bellows 530 has a compression spring 532 therein which normally tends to hold the top plates 526 flush with the top surface 501 of the cooking apparatus 30 when the bellows 530 are at atmospheric conditions.

However, the interior of each bellows 530 is adapted to be interconnected to the vacuum source 46 by a conduit means 533 having an on-off valve 534 therein, on-off valve 534 being integral with the gas valve 534A turn on for controlling the flow of fuel to burner means 525 by conduit means 525A.

Thus, when it is desired to utilize one of the top supports 524 for cooking purposes, the vacuum source 46 is interconnected to the respective bellows 530 by the valve means 534 whereby the bellows 530 collapses and raises the top plate 526 in the manner illustrated in FIG. 27 so that the same can be utilized for cooking purposes.

However, when the particular burner means 525 is not being utilized for cooking purposes, atmosphere is permitted to return to the bellows construction 530 so that the top plate 526 will be flush with the top surface 501 in the manner illustrated in FIG. 27 to provide additional work surface on the top of the cooking apparatus 30.

Accordingly, it can be seen that this invention provides improved means for pneumatically controlling various devices of a cooking apparatus or the like. However, it is to be understood that the various features of this invention are not to be limited to only a cooking apparatus.

While the form of the invention now preferred has been disclosed as required by the statutes, other forms may be used, all coming within the scope of the claims which follow.

We claim:

1. In a self-contained fuel burning apparatus or the like having a burner means and a fuel supply line for feeding fuel to said burner means, the improvement comprising pneumatically controlled valve means in said supply line whereby said valve means throttles the flow therethrough in proportion to the value of the pneumatic signal received by said valve means, a pneumatic vacuum source, temperature responsive regulator means for controlling the value of the pneumatic signal being sent to said valve means from said pneumatic vacuum source in relation to the temperature of said burner means being sensed by said regulator, said temperature responsive regulator interconnecting said pneumatic vacuum source to said pneumatically controlled valve means to actuate the same for opening said fuel supply line to said burner means and disconnecting said pneumatic vacuum source from said pneumatically controlled valve means to deactuate the same for closing said fuel supply line from said burner means, said pneumatic vacuum source comprising a vacuum pump means carried by said apparatus, and pneumatic adjusting means for adjusting the temperature range setting of said regulator.

2. In a fuel burning apparatus or the like as set forth in claim 1, a second regulator for imposing a pneumatic signal from said pneumatic vacuum source on said pneumatic adjusting means.

3. In a fuel burning apparatus or the like as set forth in claim 2, wherein said second regulator is adjustable to vary the value of the pneumatic signal being imposed on said pneumatic adjusting means of said temperature responsive regulator.

4. In a fuel burning apparatus or the like as set forth in claim 1, second and third regulators for respectively imposing pneumatic signals from said pneumatic vacuum source on said pneumatic adjusting means, and program means rendering said second and third regulators operative in a predetermined sequence.